(12) United States Patent
Stuckey et al.

(10) Patent No.: US 10,040,323 B2
(45) Date of Patent: Aug. 7, 2018

(54) PNEUMATIC TIRE WITH BEAD REINFORCING ELEMENTS AT LEAST PARTIALLY FORMED FROM CARBON FIBERS

(71) Applicant: Bridgestone Americas Tire Operations, LLC, Nashville, TN (US)

(72) Inventors: Jon I. Stuckey, Louisville, OH (US); Justin E. Hayes, Mt. Juliet, TN (US); Kent D. Weatherwax, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 612 days.

(21) Appl. No.: 13/844,505

(22) Filed: Mar. 15, 2013

(65) Prior Publication Data

US 2014/0261953 A1  Sep. 18, 2014

(51) Int. Cl.
| | | |
|---|---|---|
| *B60C 15/04* | (2006.01) | |
| *B60C 15/06* | (2006.01) | |
| *B60C 15/00* | (2006.01) | |
| *B60C 15/05* | (2006.01) | |
| *B29D 30/32* | (2006.01) | |
| *B29D 30/48* | (2006.01) | |

(52) U.S. Cl.
CPC ............. *B60C 15/04* (2013.01); *B29D 30/32* (2013.01); *B29D 30/48* (2013.01); *B60C 15/0018* (2013.01); *B60C 15/05* (2013.01); *B60C 15/0603* (2013.01); *B60C 2015/042* (2013.01); *Y10T 152/10513* (2015.01); *Y10T 152/10819* (2015.01); *Y10T 152/10846* (2015.01)

(58) Field of Classification Search
CPC ............ B60C 15/0018; B60C 15/0009; B60C 15/0081; B60C 15/00; B60C 15/04; B60C 15/0603; B60C 15/0607; B60C 15/06; B60C 2015/042; B60C 15/05; Y10T 152/10513; Y10T 152/10819
USPC ......... 152/550, 552, 539, 540, 541, 458, 545
See application file for complete search history.

(56) References Cited

U.S. PATENT DOCUMENTS

| | | | | |
|---|---|---|---|---|
| 748,858 A * | 1/1904 | Gray et al. | ..................... | 152/539 |
| 943,640 A * | 12/1909 | Latimer | | |
| 1,009,192 A * | 11/1911 | Sloper | ......................... | 152/539 |
| 1,170,597 A * | 2/1916 | Archer | | |
| 1,200,031 A * | 10/1916 | Rudd | ............................ | 152/539 |
| 1,228,144 A * | 5/1917 | Stowe | ........................... | 152/539 |

(Continued)

FOREIGN PATENT DOCUMENTS

| | | | |
|---|---|---|---|
| CN | 102555692 A | * | 7/2012 |
| DE | 36 00 145 A1 | * | 7/1987 |

(Continued)

OTHER PUBLICATIONS

English translation of DE 36 31 736 A1, Mar. 24, 1988.*

(Continued)

*Primary Examiner* — Adrienne C Johnstone

(57) ABSTRACT

A pneumatic tire includes an elastomeric casing. The elastomeric casing includes a crown portion, opposing sidewalls, and bead areas that are formed along the sidewalls in spaced relation to the crown portion. The bead areas include at least one bead reinforcing element, such as a bead core and/or a bead filler, that is at least partially formed from carbon fibers. A method of manufacturing a pneumatic tire assembly is also included.

9 Claims, 15 Drawing Sheets

(56) References Cited

U.S. PATENT DOCUMENTS

| | | | |
|---|---|---|---|
| 1,234,142 A * | 7/1917 | Dickinson | 152/539 |
| 1,258,615 A * | 3/1918 | Fisher | 152/539 |
| 4,320,791 A | 3/1982 | Fujii et al. | |
| 4,609,023 A | 9/1986 | Loser | |
| 4,688,615 A | 8/1987 | Lee | |
| 4,711,286 A | 12/1987 | Kabe et al. | |
| 4,735,249 A | 4/1988 | Kabe et al. | |
| 4,823,857 A | 4/1989 | Orjela et al. | |
| 4,934,431 A | 6/1990 | Agari et al. | |
| 5,198,050 A | 3/1993 | Gifford | |
| 5,201,971 A | 4/1993 | Gifford | |
| 5,215,613 A | 6/1993 | Shemenski et al. | |
| 5,246,051 A | 9/1993 | Inada et al. | |
| 5,285,835 A | 2/1994 | Ueyoko et al. | |
| 5,323,829 A | 6/1994 | Hubbell et al. | |
| 6,012,498 A | 1/2000 | Koch | |
| 6,352,093 B1 | 3/2002 | Losey | |
| 6,361,860 B1 | 3/2002 | Koch | |
| 6,371,183 B1 | 4/2002 | Ubukata et al. | |
| 6,374,888 B1 | 4/2002 | Willard, Jr. et al. | |
| 6,408,914 B1 | 6/2002 | Lamock et al. | |
| 6,453,960 B1 | 9/2002 | Kondo et al. | |
| 6,513,559 B2 | 2/2003 | Arakawa | |
| 6,595,256 B1 | 7/2003 | Bernstorf et al. | |
| 6,598,634 B1 | 7/2003 | Koch et al. | |
| 6,598,641 B1 * | 7/2003 | Watson Fyfe | 152/550 X |
| 6,732,776 B2 | 5/2004 | Mani et al. | |
| 6,929,045 B1 | 8/2005 | Ogawa | |
| 6,951,234 B2 | 10/2005 | Herbelleau et al. | |
| 6,966,351 B2 | 11/2005 | Scarpitti | |
| 6,997,224 B2 | 2/2006 | Herbelleau et al. | |
| 7,093,634 B2 | 8/2006 | Rayman et al. | |
| 7,284,582 B2 | 10/2007 | Zanzig et al. | |
| 7,284,583 B2 | 10/2007 | Dheur et al. | |
| 2001/0001971 A1 | 5/2001 | Cottrell | |
| 2002/0050314 A1 | 5/2002 | Nakamura | |
| 2006/0070691 A1 | 4/2006 | Iio | |
| 2006/0237113 A1 | 10/2006 | Almonacil et al. | |
| 2007/0125468 A1 | 6/2007 | Poling et al. | |
| 2007/0125469 A1 | 6/2007 | Poling et al. | |
| 2008/0135148 A1 | 6/2008 | Datta et al. | |
| 2008/0179940 A1 | 7/2008 | Hill et al. | |
| 2009/0151845 A1 | 6/2009 | Skurich et al. | |
| 2009/0178749 A1 | 7/2009 | Monnerie | |
| 2009/0194215 A1 | 8/2009 | Daghini et al. | |
| 2010/0000652 A1 | 1/2010 | Tresoldi et al. | |
| 2010/0051157 A1 | 3/2010 | Botts et al. | |
| 2010/0051160 A1 | 3/2010 | Daghini et al. | |
| 2010/0224298 A1 | 9/2010 | Rampana et al. | |
| 2012/0085476 A1 | 4/2012 | Donckels et al. | |

FOREIGN PATENT DOCUMENTS

| | | | |
|---|---|---|---|
| DE | 36 31 736 A1 * | 3/1988 | |
| EP | 0 928 680 A1 * | 7/1999 | |
| EP | 0983876 A2 | 3/2000 | |
| EP | 0997263 A2 | 8/2000 | |
| EP | 1512717 | 3/2005 | |
| EP | 1890892 A1 | 2/2008 | |
| JP | S50-102001 A | 8/1975 | |
| JP | S56-40043 B | 9/1981 | |
| JP | S59-120503 A | 7/1984 | |
| JP | S60-124506 A | 7/1985 | |
| JP | 60255509 A | 12/1985 | |
| JP | S60-255502 A | 12/1985 | |
| JP | 64016901 U | 1/1989 | |
| JP | H04-45365 B | 7/1992 | |
| JP | 2002-067629 A | 3/2002 | |
| JP | 2002-521252 A | 7/2002 | |
| JP | 2003-500281 A | 1/2003 | |
| JP | 2003-252013 A | 9/2003 | |
| JP | 2004-203332 A | 7/2004 | |
| JP | 3756604 B2 | 3/2006 | |
| JP | 2006-517164 A | 7/2006 | |
| SU | 1661002 A1 * | 7/1991 | |

OTHER PUBLICATIONS

English machine translation of CN 102555692 A, Jul. 11, 2012.*
JP57066007A—Translation Abstract Apr. 22, 1982.
JP4133807A—Translation Abstract May 7, 1992.
JP60255509—Translation Abstract Dec. 17, 1985.
International Search Report and Written Opinion for corresponding patent application No. PCT/US2014/015911 dated May 23, 2014.
Thanbichler, Peter, Extended European Search Report for Patent Application No. EP14768327.0, dated Oct. 27, 2016, pp. 1-7, European Patent Office, Munich, Germany.
English abstract of JP3756604.
English abstract of DE3631736A.
English abstract of JP2002067629A.
English abstract of JP2003252013A.
English abstract of JP2003500281A.
English abstract of JP2004203332A.
English abstract of JP2006517164A.
English abstract of JP2002521252A.

* cited by examiner

PNEUMATIC TIRE WITH BEAD REINFORCING ELEMENTS AT LEAST PARTIALLY FORMED FROM CARBON FIBERS

The subject matter of the present disclosure broadly relates to the art of pneumatic tires and, more particularly, to pneumatic tires that include bead reinforcing elements that are at least partially formed from carbon fibers as well as methods of manufacturing pneumatic tires utilizing such bead reinforcing elements.

BACKGROUND

Pneumatic tires typically include a tire casing with sidewalls that extend radially inward from a crown portion and terminate at bead areas. In an installed condition of the pneumatic tire, the bead areas are positioned on or along corresponding bead seats of an associated wheel. The bead areas are dimensioned to tightly interengage the bead seats. In this manner, a substantially air-tight assembly can be formed between the pneumatic tire and the associated wheel. As such, a pneumatic tire and wheel assembly can be formed that is capable of retaining a quantity of air at an elevated pressure level for an extended period of time.

Additionally, the interengagement between the bead areas of a pneumatic tire and the corresponding bead seats of an associated wheel should be sufficiently robust to transmit the full torque acting on the pneumatic tire without permitting relative movement between the pneumatic tire and the associated wheel. In general, the torque acting on the pneumatic tire is developed during use of the vehicle due to the transmission of forces between the associated wheel and the road surface. It will be appreciated that such torque can be generated during both acceleration and deceleration of the vehicle.

In many cases, wheels are manufactured to industry standard dimensions and include bead seats having established configurations and/or constructions. To ensure that a robust interconnection can be formed between a pneumatic tire and an associated wheel, the bead areas of pneumatic tires are dimensioned such that a portion of the rubber forming the bead areas is radially compressed along the bead seats when installed. Substantially-inextensible reinforcing elements are typically embedded within the bead areas such that the portions of rubber that are compressed along the bead seats are disposed radially inwardly of the reinforcing elements. Such inextensible reinforcing elements typically take the form of endless, annular tensile members that are commonly referred to in the art as bead cores.

In an installed condition of the pneumatic tire, the bead cores are placed in tension due, at least in part, to the compression of the portions of rubber that are disposed radially inward of the bead cores and engage the bead seats of the corresponding wheel. To establish and maintain a robust interengagement between the pneumatic tire and the associated wheel, the bead cores are constructed to be substantially inextensible under the tensile loads incurred during installation and use.

Typically, bead cores are made of one or more steel wires arranged in an annular configuration, such as in the shape of a circular hoop, for example, and can have any one of a variety of known cross-sectional shapes, such as circular, square, rectangular, trapezoidal, hexagonal or variations thereof. In some cases, bead cores are formed from a relatively short length of wire or rod having opposing ends that are welded or otherwise joined together to form a solid ring. In other cases, bead cores are formed from one or more elongated lengths of smaller diameter wire that are wrapped and wound into an annular ring.

Although known pneumatic tire constructions generally operate satisfactorily, it remains desirable to increase pneumatic tire performance, and to reduce weight and/or manufacturing costs of pneumatic tires over known constructions. As such, the subject matter of the present disclosure seeks to provide these and/or other benefits and/or improvements over known pneumatic tire constructions.

BRIEF DESCRIPTION

One example of a pneumatic tire in accordance with the subject matter of the present disclosure can include an elastomeric tire casing that extends peripherally about an axis of rotation. The elastomeric tire casing can include a crown portion that extends in a generally axial direction. Opposing sidewalls can be disposed in axially-spaced relation to one another and can extend radially inwardly from along the crown portion to respective bead areas. A plurality of bead reinforcing elements can be provided with at least one of the bead reinforcing elements embedded within each of the bead areas. The bead reinforcing elements can be at least partially formed from carbon fibers.

One example of a bead reinforcing element in accordance with the subject matter of the present disclosure dimensioned for use in forming a bead area of an associated pneumatic tire can include an annular body having an outer surface and extending peripherally about an axis of rotation. The annular body can be at least partially formed from a plurality of carbon fibers and a quantity of matrix material.

One example of a method of manufacturing a pneumatic tire in accordance with the subject matter of the present disclosure can include orienting at least one layer of material comprised of rubber along an associated tire building drum. The method can also include providing a bead reinforcing element comprised of a plurality of carbon fibers, and positioning the bead reinforcing element along the at least one layer of material. The method can further include anchoring the at least one layer of material to the bead reinforcing element. The method can also include positioning a belt package and a tread along the at least one layer of material to form an uncured tire assembly. The method can also include curing the assembly to form a pneumatic tire.

DETAILED DESCRIPTION

As used herein, terms such as "fiber," "filament," and the like, are used interchangeably in reference to material having a small cross-sectional dimension, such as a cross-sectional dimension within a range of from approximately 1 µm to approximately 25 µm, for example, and an indefinite elongated length. In a preferred arrangement, fiber material can have a cross-sectional dimension within a range of from approximately 4 µm to approximately 10 µm.

As used herein, terms such as "carbon fiber," "carbon filament," and the like, are used interchangeably in reference to material of the foregoing cross-sectional dimensions and lengths that are that are formed by carbonizing a precursor fiber. In some cases, carbon fibers suitable for use in accordance with the subject matter of the present disclosure can possess a tensile modulus within a range of from approximately 50 GPa to approximately 350 GPa, can possess a cross-sectional dimension within a range of from approximately 4 µm to approximately 10 µm, and/or can possess a tensile elongation of 2.5 percent or less.

Additionally, as used herein, terms such as "fibers," "filaments," "carbon fibers," "carbon filaments," and the like can refer to two or more individual lengths of material. In some cases, such terms can refer to bulk quantities of material (e.g., thousands of fibers, hundreds of thousands of fibers, millions of fibers, tens of millions of fibers) that can be either oriented (e.g., generally aligned or otherwise loosely organized) or non-oriented (e.g., randomly positioned in a multitude of directions).

As used herein, terms such as "yarn," "tow," and the like, are used in reference to a multitude of fibers, such as one thousand or more fibers, for example, that are laid, twisted and/or otherwise bundled together in a continuous, elongated strand of indefinite length. As one example, a yarn can include a quantity of fibers within a range of from approximately 1000 fibers to approximately 500,000 fibers.

As used herein, terms such as "cord," and the like, are used in reference to the product of one or more yarns that may be laid, twisted or otherwise bundled together in a continuous, elongated strand of indefinite length. In some cases, the one or more yarns may be treated with a binder, adhesive and/or matrix material.

Figure 1:
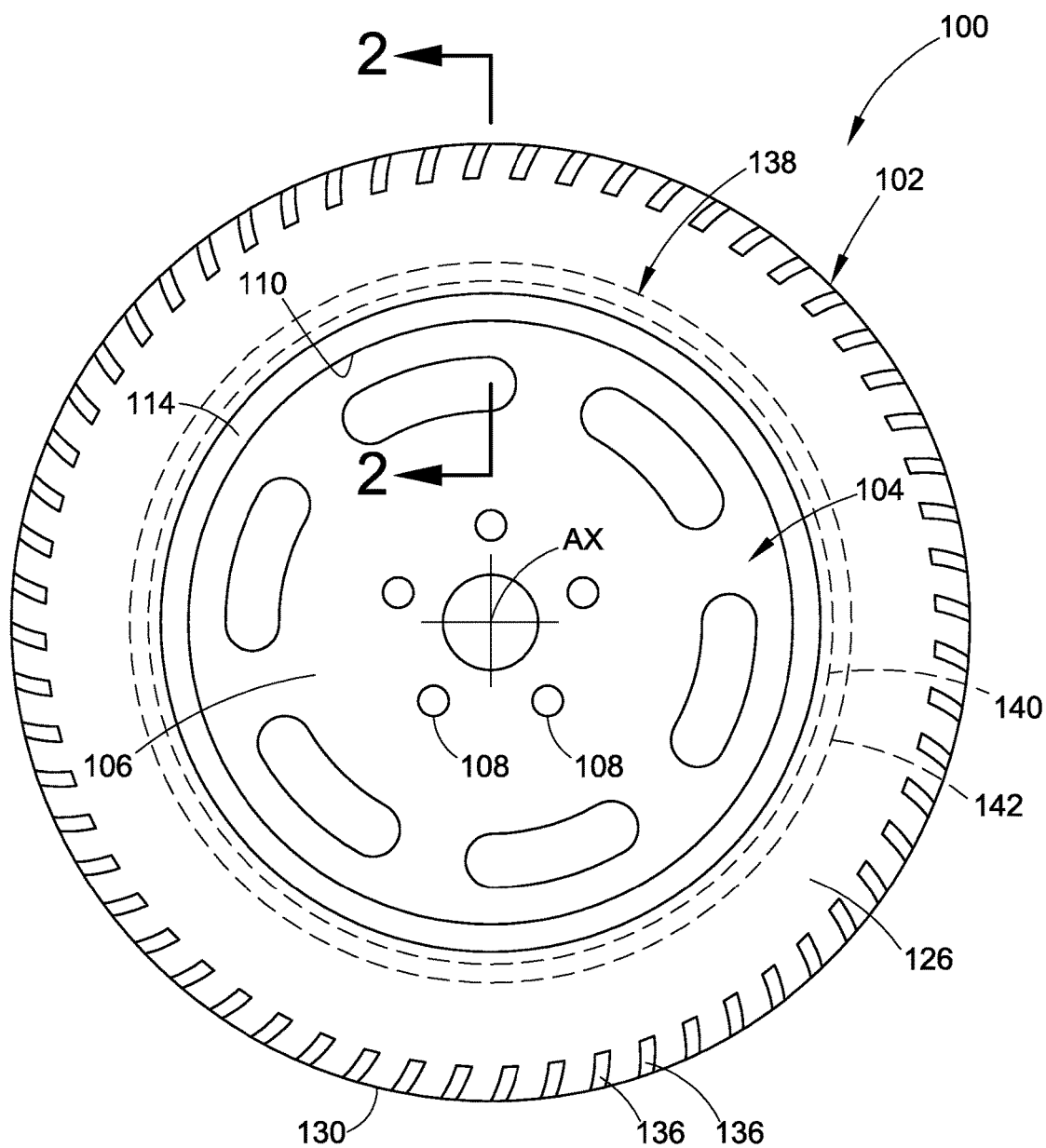
FIG. 1 is a diagrammatic side view of one example of a tire and wheel assembly that includes a pneumatic tire in accordance with the subject matter of the present disclosure.
Figure 2:
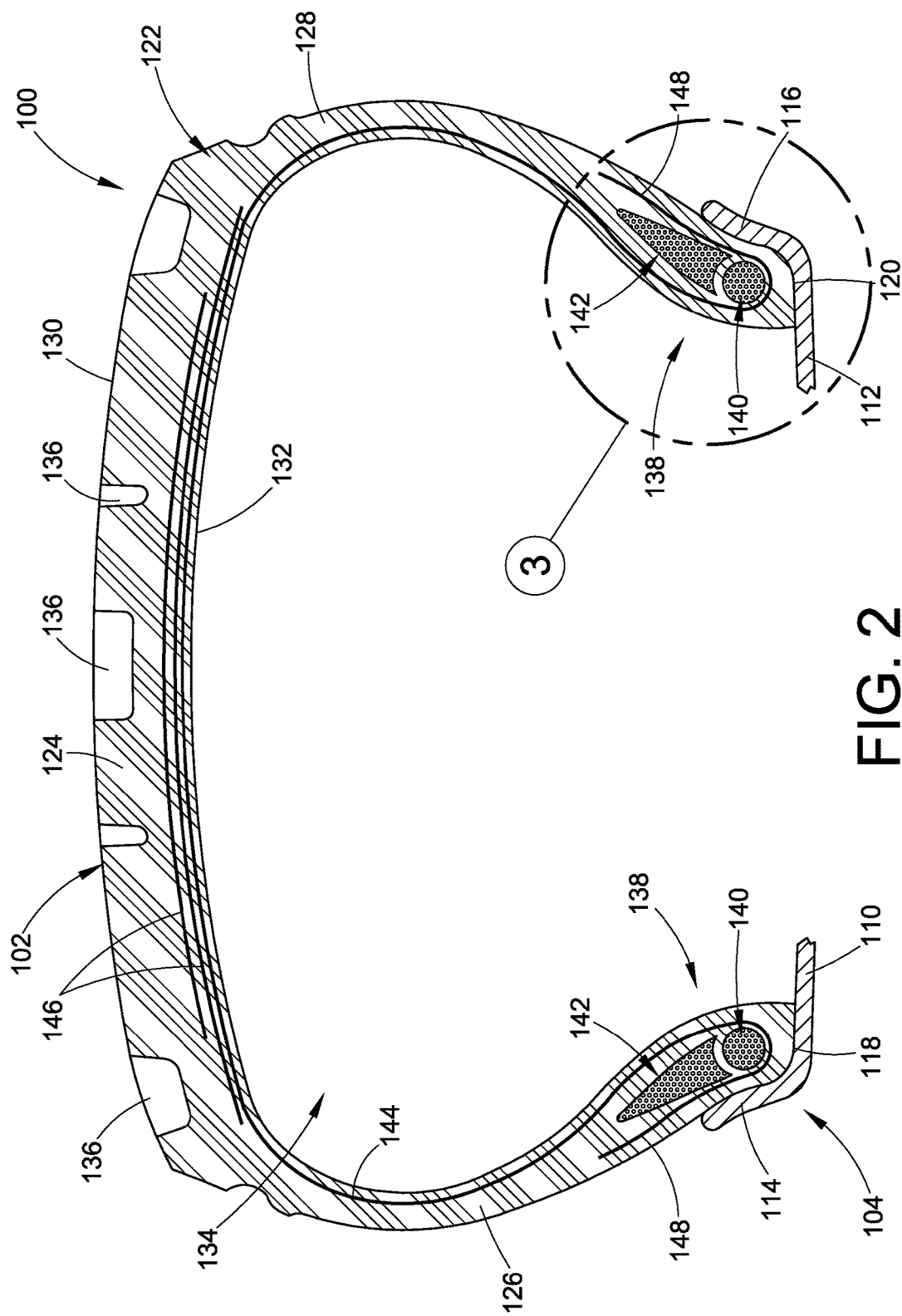
FIG. 2 is a diagrammatic cross-sectional view of the assembly in FIG. 1 taken from along line 2-2 thereof.

Turning now to the drawings wherein the showings are provided for the purpose of illustrating exemplary embodiments of the subject matter of the present disclosure and which drawings are not intended to be limiting, FIG. 1 illustrates a tire and wheel assembly 100 that includes a pneumatic tire 102 installed on a conventional wheel 104 that permits operation and use of the pneumatic tire in an inflated condition. In the exemplary arrangement in FIGS. 1 and 2, wheel 104, which can be of any suitable type, kind, construction and/or configuration, is shown as including a mounting hub 106 having a plurality of mounting holes 108 in a suitable hole pattern. Wheel 104 is also shown as including opposing rim walls 110 and 112 (FIG. 2) that terminate at corresponding flanges 114 and 116. As illustrated in FIG. 2, bead seats 118 and 120 are respectively formed along rim walls 110 and 112 adjacent flanges 114 and 116.

Tire 102 extends circumferentially about an axis AX (FIG. 1) and includes an elastomeric casing 122 (FIG. 2) that has a crown portion 124 and axially-spaced sidewalls 126 and 128 that extend radially inward from along crown portion 124. The crown portion includes an outer surface 130 and an inner surface 132 that at least partially defines a tire cavity 134. Grooves 136 can be provided along outer surface 130 of crown portion 124 in any desired pattern or configuration to form a tire tread, as is well known in the art.

In the exemplary arrangement shown in FIGS. 1 and 2, pneumatic tire 102 includes bead areas 138 (which, in some cases, may be alternately referred to as "mounting beads" or "mounting bead areas") that form the radially-inward extent of sidewalls 126 and 128. The bead areas are dimensioned or otherwise adapted to form an air-tight relationship along bead seats 118 and 120 in an installed condition of pneumatic tire 102 on wheel 104. As such, when mounted on a wheel, pneumatic tire 102 can be inflated through a conventional valve (not shown) that is operatively connected with tire cavity 134, such as through one of rim walls 110 and 112 of wheel 104, for example. Additionally, it will be appreciated that bead areas having a wide variety of combinations of shapes, sizes, features and elements have been developed and can be included on pneumatic tire 102. Non-limiting examples of such features and elements include bead toe features, bead heel features, bead flippers, bead chippers, and chaffing strips.

Regardless of the one or more other features and/or elements that may be included on or along the bead areas of a pneumatic tire in accordance with the subject matter of the present disclosure, the bead areas of the pneumatic tire also include at least one bead reinforcing element (e.g., a bead core and/or a bead filler) that includes or is otherwise at least partially formed from carbon fibers. In the exemplary arrangement in FIGS. 1-3, for example, bead areas 138 of pneumatic tire 102 are each shown as including bead reinforcing elements in the forms of a bead core 140 and a bead filler 142.

As is well known in the art, pneumatic tires, such as pneumatic tire 102, for example, also include one or more plies containing a multiplicity of closely-spaced radial reinforcing cords or wires that extend across the crown portion of the tire casing and radially inward along the sidewalls of the tire casing. In the exemplary arrangement in FIGS. 1 and 2, tire casing 122 (FIG. 2) shown as being reinforced by a weftless radial ply 144 that extends across crown portion 124 and along sidewalls 126 and 128 toward bead areas 138. Further reinforcement of the tire can be provided by one or more annular belts, such as belts 146 that extend circumferentially along crown portion 124, for example. Radial ply 144 and belts 146 can be fabricated of any suitable material or combination of materials, such as steel wires or suitable textile fibers, for example, as is well known in the art.

Bead cores 140 take the form of substantially-inextensible, endless rings that are embedded within bead areas 138. One function of bead reinforcing elements (e.g., bead cores 140) is to establish and maintain the cross-sectional dimension of bead areas 138 and the openings formed thereby such that the pneumatic tire can be mounted along corresponding bead seats of an associated wheel (e.g., bead seats 118 and 120 of wheel 104), such as may be established by industry standards and conventions.

Figure 3:
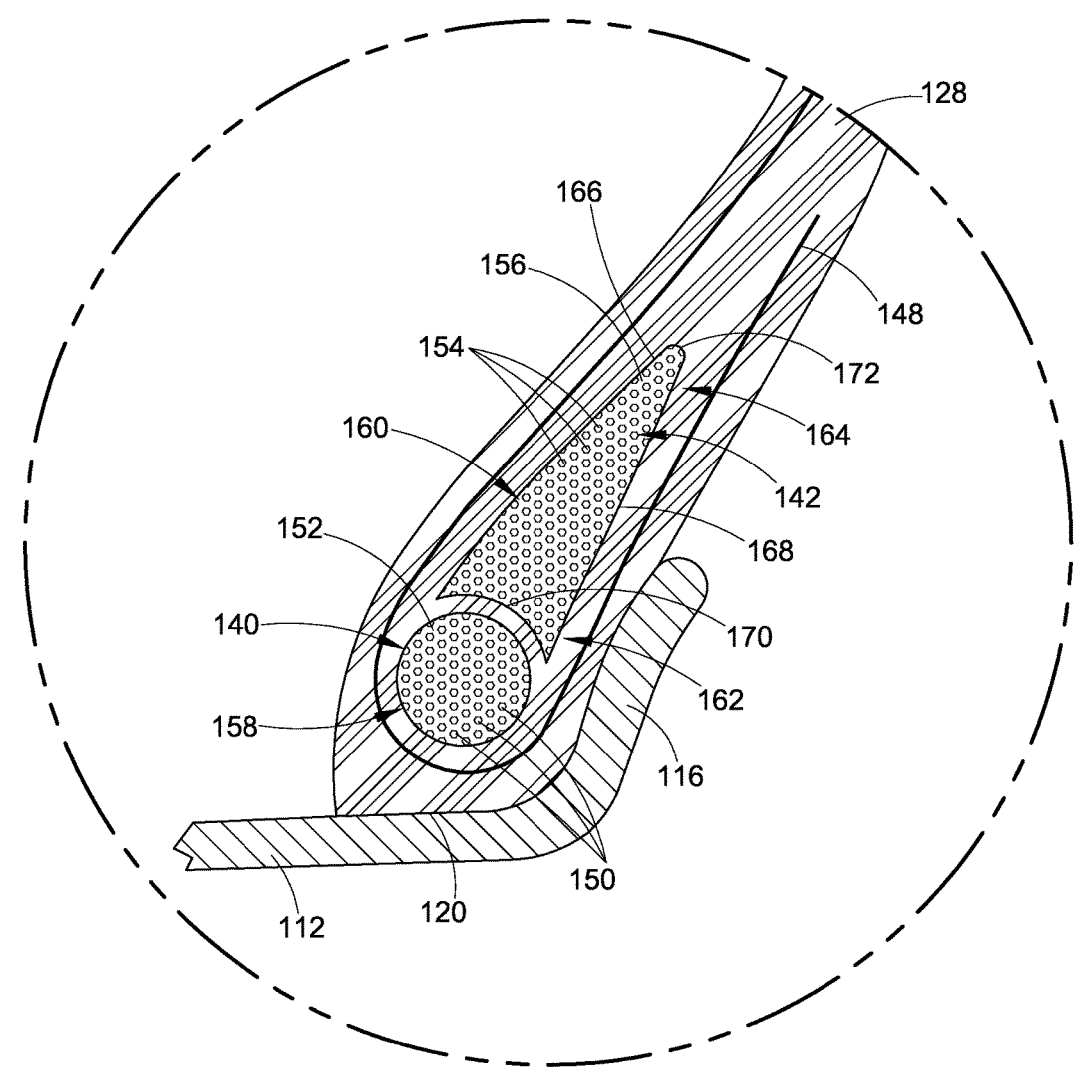
FIG. 3 is an enlarged view of the portion of the assembly in FIGS. 1 and 2 identified as Detail 3 in FIG. 2 illustrating one example of a bead area including bead reinforcing elements in accordance with the subject matter of the present disclosure.

Another function of bead reinforcing elements (e.g., bead cores 140) is to anchor radial plies, such as radial ply 144, for example, as the same extend across the tire carcass between the opposing bead areas. It will be appreciated that such radial plies can be anchored by bead cores 140 in any suitable manner. For example, radial ply 144 is shown in FIGS. 2 and 3 as extending from along sidewalls 126 and 128 toward bead areas 138. Radial ply 144 extends in a radially-inward direction along an axially-inward side of bead core 140 and through the opening formed by the bead core. Outer ends 148 of radial ply 144 are turned up along an axially-outward side of bead core 140 and return in a radially-outward direction along sidewalls 126 and 128. Bead fillers 142 are shown disposed adjacent bead cores 140 in an area between radial ply 144 and outer ends 148, and can operate to at least partially fill any gap between radial ply 144 and outer end 148 and/or can operate to provide added rigidity and/or stiffness to the bead area. It will be appreciated, however, that other arrangements and/or configurations could alternately be used, and that the arrangement shown is merely exemplary.

As previously stated, a pneumatic tire in accordance with the subject matter of the present disclosure, such as pneumatic tire 102, for example, can include any number of one or more bead cores and/or one or more bead fillers that include or are otherwise at least partially formed from carbon fibers, carbon fiber yarns, carbon fiber cords, or any combination thereof, such as have been previously described herein. In some cases, the bead cores can be formed from a combination of a multiplicity of elongated carbon fibers (in any of the aforementioned forms) and a binder or matrix material, and the bead filler can be of a conventional construction, such as, for example, could be formed from a conventional rubber material. In other cases, the bead cores can be of a conventional construction, such as, for example, could be formed from one or more steel wires that are wound or otherwise wrapped into a known configuration, and the bead fillers can be formed from a combination of a multiplicity of elongated carbon fibers (in any of the aforementioned forms) and a binder or matrix material. In still other cases, the bead cores can be of a size, shape and/or configuration suitable for functioning as both a bead core and a bead filler. In such cases, the inclusion of a separate bead filler could be avoided.

In the embodiment in FIGS. 1-3, bead cores 140 and bead fillers 142 are both shown as being formed, substantially entirely, from a combination of a multitude of carbon fibers and a binder or matrix material with the carbon fibers taking the form of individual carbon fibers (oriented and/or non-oriented), elongated carbon fiber yarns, or any combination thereof.

Additionally, it will be appreciated that any combination of bead cores and bead fillers in accordance with the subject matter of the present disclosure can be used. As identified in FIG. 3 bead cores 140 are shown as including carbon fibers 150 and binder or matrix material 152, and bead fillers 142 are shown as including carbon fibers 154 and binder or matrix material 156. In some cases, elongated carbon fibers 150 and 154 may be substantially identical to one another, and matrix materials 152 and 156 may be substantially identical to one another. In other cases, however, the elongated carbon fibers and/or the matrix materials may be different in the bead cores than in the bead fillers, such as may be useful for providing different performance characteristics (e.g., elongation, flexibility) between the bead cores and the bead fillers.

Additionally, it will be appreciated that bead reinforcing elements (e.g., bead cores 140 and bead fillers 142) can be of any suitable size, shape, configuration and/or arrangement. As one example, bead cores 140 are shown in FIGS. 2 and 3 as taking the form of endless, annular rings that have an outer surface or shape 158 with an approximately circular cross-sectional shape. As another example, bead fillers 142 are shown in FIGS. 2 and 3 as taking the form of endless, annular rings that have an outer surface or shape 160 that extends, in cross-sectional profile, from a radially-inward profile end 162 toward a radially-outward profile end 164. In some cases, outer surface 160 can include opposing side surface portions 166 and 168 that extend at an angle relative to one another from an end surface portion 170 toward an outermost peripheral edge 172. In some cases, the one or more of the side surface portions can have a substantially linear (e.g., approximately straight) cross-sectional profile. In other cases, the one or more of side surface portions can have a curved cross-sectional profile, such as is shown in FIGS. 2 and 3, for example. In the arrangement shown in FIGS. 2 and 3, bead fillers 142 have a wedge-like cross-sectional shape. It will be appreciated, however, that other configurations and/or arrangements could alternately be used.

Figure 4:
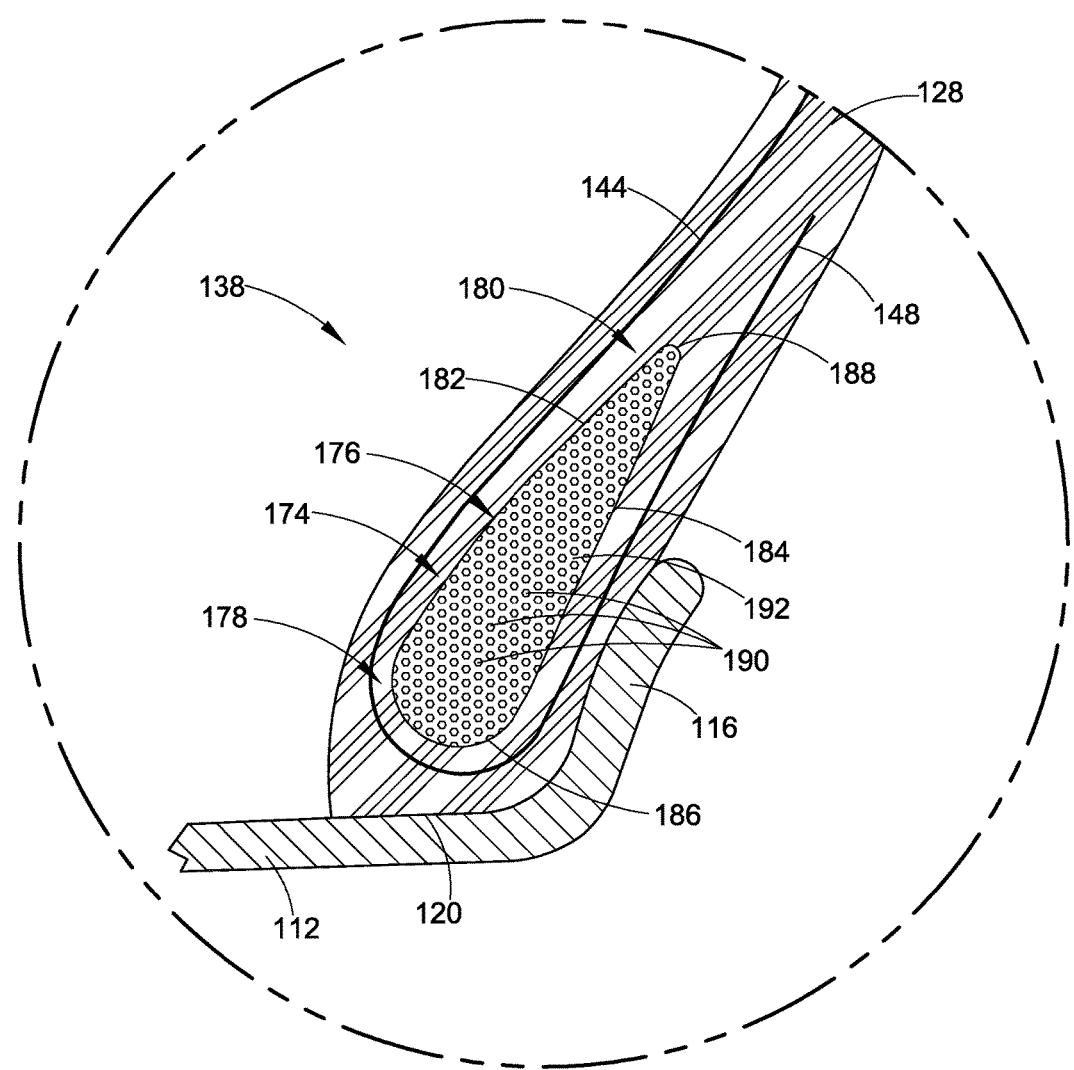
FIG. 4 is an enlarged view of the portion of the assembly in FIGS. 1-3 illustrating another example of a bead area including a bead reinforcing element in accordance with the subject matter of the present disclosure.

An alternate configuration of a bead reinforcing element in accordance with the subject matter of the present disclosure is shown in FIG. 4 in which bead areas 138 include bead cores 174 in place of bead cores 140 and bead fillers 142. Bead cores 174 (only one of which is shown in FIG. 4) take the form of endless annular rings that have an outer surface or shape 176 that extends, in cross-sectional profile, from a radially-inward profile end 178 toward a radially-outward profile end 180. In some cases, outer surface 176 can include opposing side surface portions 182 and 184 that extend at an angle relative to one another from an end surface portion 186 toward an outermost peripheral edge 188. In some cases, one or more of the side surface portions can have a substantially linear (e.g., approximately straight) cross-sectional profile.

In other cases, one or more of side surface portions can have a curved cross-sectional profile, such as is shown in FIG. 4, for example.

In the arrangement shown in FIG. 4, bead cores 174 have a teardrop-like cross-sectional shape. It will be appreciated, however, that other configurations and/or arrangements could alternately be used. Additionally, it will be recognized that a separate bead filler is not shown as being included in the arrangement in FIG. 4. Rather, each of bead cores 174 can function as both a bead core and a bead filler. Bead cores 174 are shown in FIG. 4 as being formed from a combination of a multitude of elongated carbon fibers 190 and a binder or matrix material 192.

Figure 5:
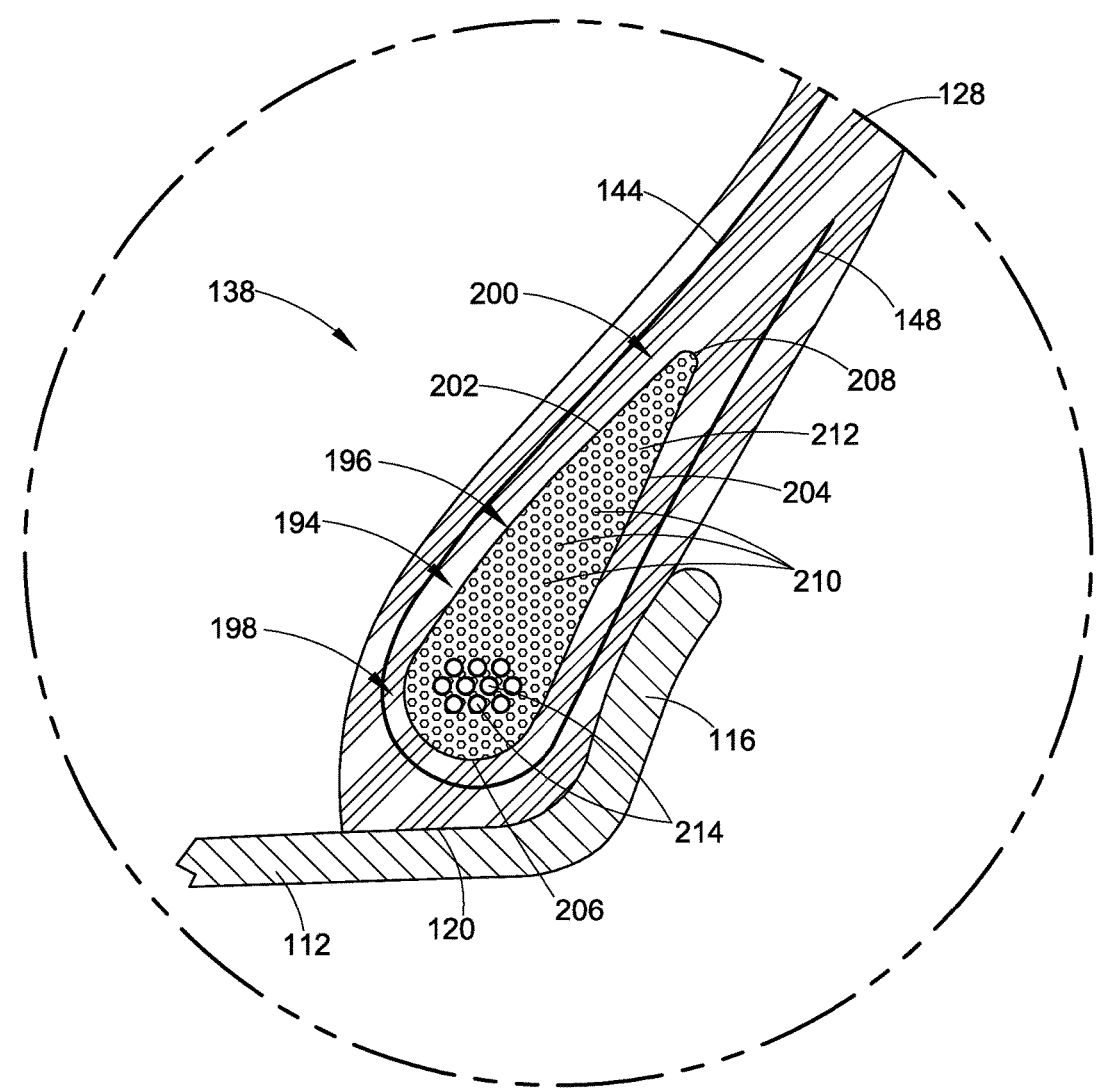
FIG. 5 is an enlarged view of the portion of the assembly in FIGS. 1-3 illustrating still another example of a bead area including a bead reinforcing element in accordance with the subject matter of the present disclosure.

Another alternate construction of a bead reinforcing element in accordance with the subject matter of the present disclosure is shown in FIG. 5 in which bead areas 138 include a bead core 194 in place of bead core 140 and bead filler 142. Bead cores 194 (only one of which is shown in FIG. 5) take the form of endless annular rings that have an outer surface or shape 196 that extends, in cross-sectional profile, from a radially-inward profile end 198 toward a radially-outward profile end 200. In some cases, outer surface 196 can include opposing side surface portions 202 and 204 that extend at an angle relative to one another from an end surface portion 206 toward an outermost peripheral edge 208. In some cases, one or more of the side surface portions can have a substantially linear (e.g., approximately straight) cross-sectional profile. In other cases, one or more of side surface portions can have a curved cross-sectional profile, such as is shown in FIG. 5, for example.

In the arrangement shown in FIG. 5, bead cores 194 have a teardrop-like cross-sectional shape. It will be appreciated, however, that other configurations and/or arrangements could alternately be used. Additionally, it will be recognized that a separate bead filler is not shown as being included in the arrangement in FIG. 5. Rather, each of bead cores 194 can function as both a bead core and a bead filler. Bead cores 194 are shown in FIG. 5 as being formed from a combination of a multitude of elongated carbon fibers 210 and a binder or matrix material 212.

Bead cores 194 are shown in FIG. 5 as being of similar size and shape to bead cores 174, which have been previously described above in connection with FIG. 4. Bead cores 194 differ from bead cores 174 in that bead cores 194 also include one or more reinforcing elements embedded within the bead cores. In the exemplary arrangement in FIG. 5, a plurality of reinforcing elements 214 are shown as being embedded within bead cores 194. It will be appreciated that the reinforcing elements can be positioned in any suitable configuration and/or arrangement. For example, it will be appreciated that reinforcing elements 214 are shown in FIG. 5 as being disposed generally along end 198 toward end surface portion 206. It will be appreciated, however, that in other arrangements, one or more of the reinforcing elements could be disposed toward end 200 and or otherwise distributed in any suitable manner between ends 198 and 200.

Additionally, it will be appreciated that elements 214 can be of any suitable size, shape, quantity, construction, and/or any combination thereof. In some cases, for example, one or more of reinforcing elements 214 could be formed from one or more individual lengths of metal wire, such as in the form of solid or wound wire constructions, for example. In other cases, one or more of reinforcing elements 214 could be formed from one or more elongated lengths of non-metal material, such as one or more carbon fiber cords (e.g., a plurality of wound, twisted or otherwise bundled carbon fibers or carbon fiber yarns), for example. In a preferred arrangement, the one or more reinforcing elements can be substantially-entirely embedded within bead core 194. In such cases, the one or more reinforcing elements may not be exposed along or otherwise extend through outer surface 196.

Figure 6:
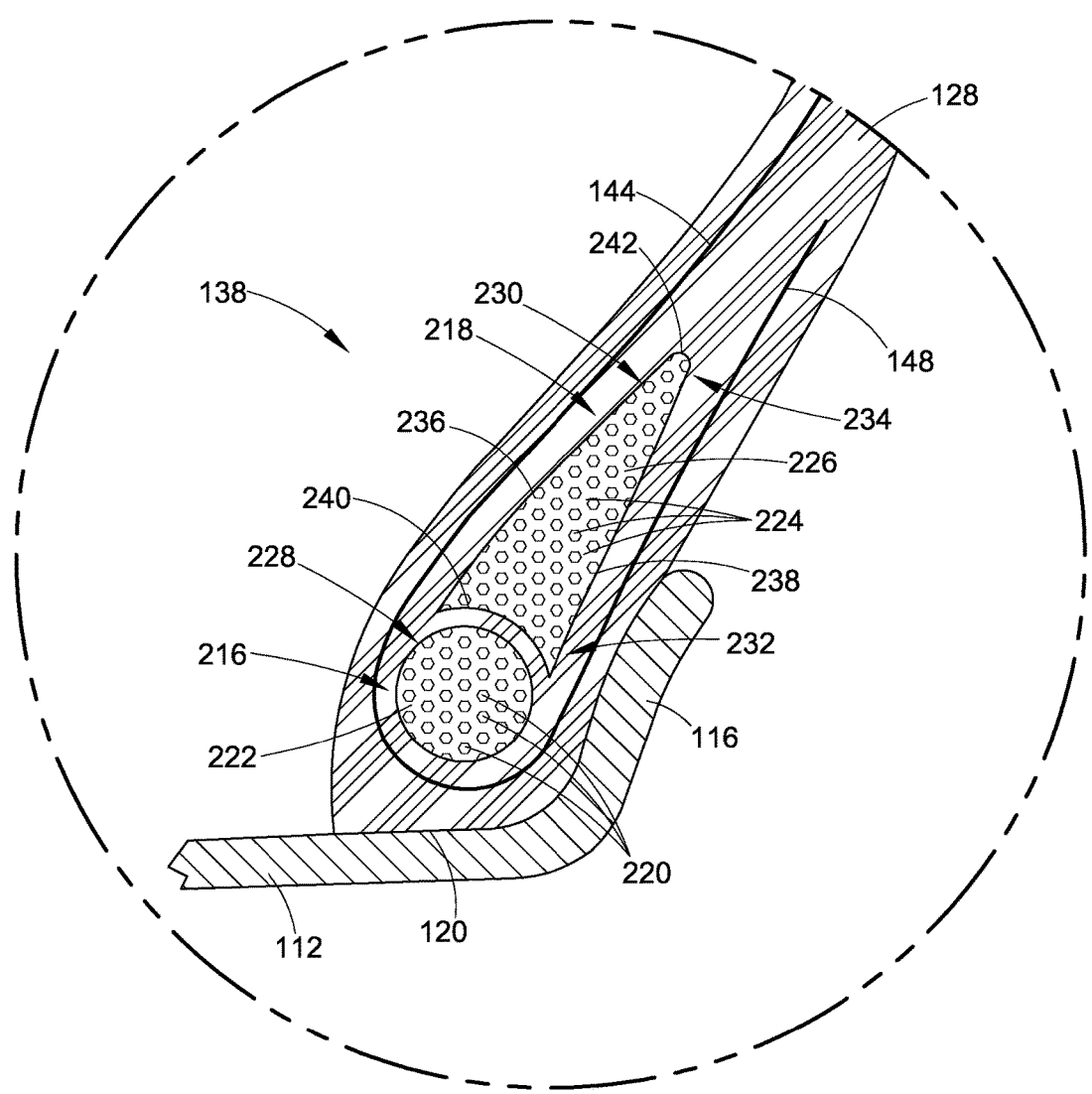
FIG. 6 is an enlarged view of the portion of the assembly in FIGS. 1-3 illustrating a further example of a bead area including bead reinforcing elements in accordance with the subject matter of the present disclosure.

Still another alternate construction of a bead reinforcing element in accordance with the subject matter of the present disclosure is shown in FIG. 6 in which bead areas 138 can include a bead core 216 in place of bead core 140 and/or a bead filler 218 in place of bead filler 142. In the arrangement shown in FIG. 6, both bead cores 140 and bead fillers 142 have been respectively replaced by bead core 216 and bead filler 218. It will be appreciated, however, that other configuration and/or combination of components could alternately be used.

As discussed above, it will be appreciated that any combination of bead cores and/or bead fillers in accordance with the subject matter of the present disclosure can be used in forming a bead area of a pneumatic tire. For example, as identified in FIG. 6, bead cores 216 are shown as including elongated carbon fibers in the form of carbon fiber cords 220 and binder or matrix material 222, and bead fillers 218 are shown as including elongated carbon fibers in the form of carbon fiber cords 224 and binder or matrix material 226. In some cases, carbon fiber cords 220 and 224 may be substantially identical to one another, and matrix materials 222 and 226 may be substantially identical to one another. In other cases, however, the carbon fiber cords and/or the matrix materials may be different in the bead cores than in the bead fillers, such as may be useful for providing different performance characteristics (e.g., elongation, flexibility) between the bead cores and the bead fillers.

Bead cores 216 and bead fillers 218 (only one of each of which is shown in FIG. 6) take the form of endless annular rings. Bead cores 216 and bead fillers 218 can differ from bead cores 140 and bead fillers 142, respectively, in that bead cores 216 and bead fillers 218 include a plurality of carbon fibers in the form of one or more carbon fiber bundles or cords 220 and 224, respectively, rather than elongated carbon fibers or carbon fiber yarns, as in bead cores 140 and/or bead fillers 142. In some cases, the carbon fiber cords can be bundled or otherwise interconnected with one another to form one or both of bead cores 216 and bead fillers 218 without an encapsulating matrix material. In other cases, the one or more carbon fiber cords can be encapsulated within a binder or matrix material (e.g., matrix material 222 and/or 226). In the latter of such cases, bead cores 216 can have an outer surface or shape 228, and are shown in FIG. 6 as having an approximately circular cross-sectional shape. Though, it will be appreciated that any other suitable shape and/or configuration could alternately be used.

Additionally, bead fillers 218 can take the form of endless, annular rings that have an outer surface or shape 230 that extends, in cross-sectional profile, from a radially-inward profile end 232 toward a radially-outward profile end 234. In some cases, outer surface 230 can include opposing side surface portions 236 and 238 that extend at an angle relative to one another from an end surface portion 240 toward an outermost peripheral edge 242. In some cases, one or more of the side surface portions can have a substantially linear (e.g., approximately straight) cross-sectional profile. In other cases, one or more of side surface portions can have a curved cross-sectional profile, such as is shown in FIG. 6, for example. In the arrangement shown in FIG. 6, bead fillers 218 have a wedge-like cross-sectional shape. It will be appreciated, however, that other configurations and arrangements could alternately be used.

Figure 7:
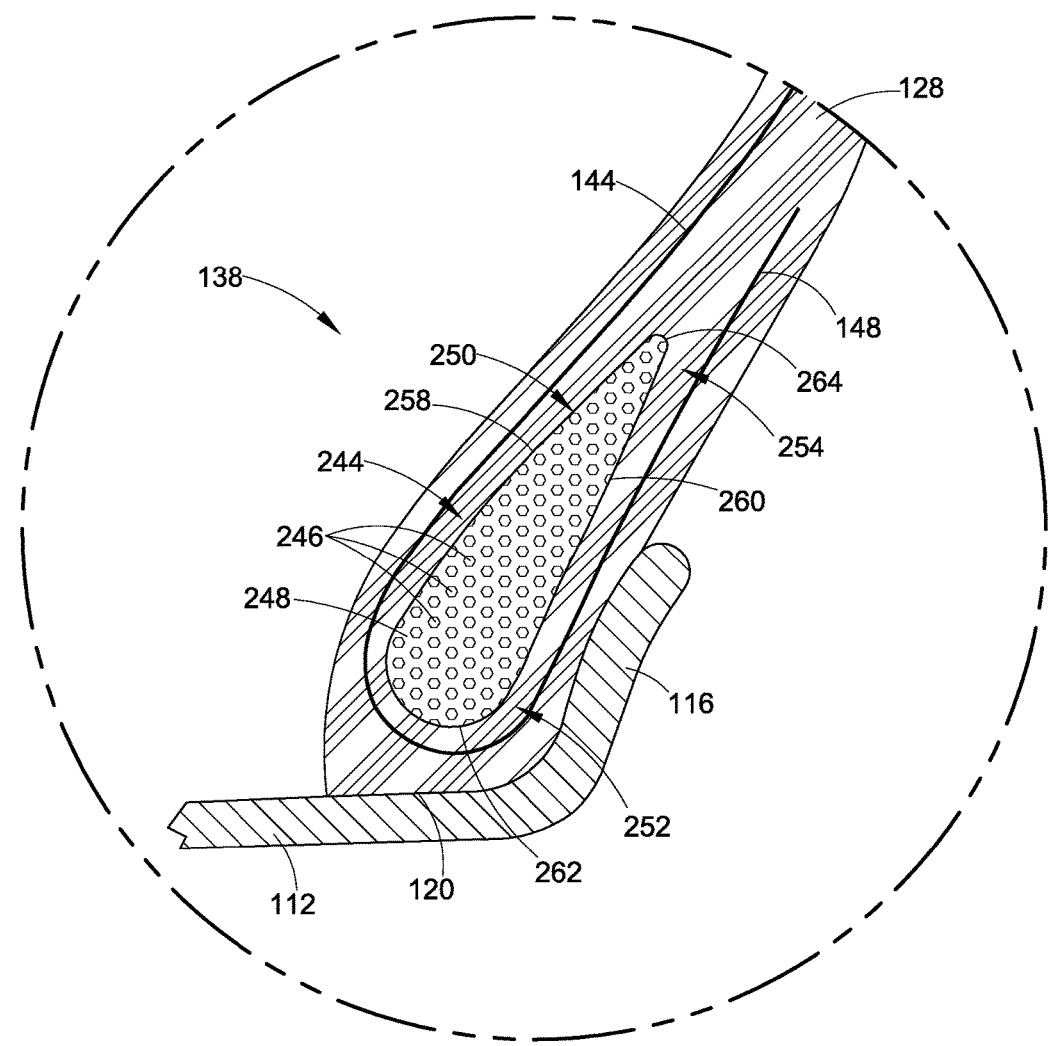
FIG. 7 is an enlarged view of the portion of the assembly in FIGS. 1-3 illustrating still a further example of a bead area including a bead reinforcing element in accordance with the subject matter of the present disclosure.

Yet another alternate configuration of a bead reinforcing element in accordance with the subject matter of the present disclosure is shown in FIG. 7 in which bead areas 138 include bead cores 244 (only one of which is shown in FIG. 7) in place of bead cores 140 and bead fillers 142. Bead cores 244 differ from bead cores 140 and bead fillers 142 in that bead cores 244 have a teardrop-like cross-sectional shape. As such, it will be recognized that a separate bead filler is not shown as being included in the arrangement in FIG. 7. Rather, each of bead cores 244 can function as both a bead core and a bead filler.

Bead cores 244 also differ from bead cores 140 and bead fillers 142, respectively, in that bead cores 244 include a plurality of carbon fibers in the form of one or more carbon fiber bundles or cords 246 rather than elongated carbon fibers or carbon fiber yarns, as in bead cores 140 and/or bead fillers 142. In some cases, the carbon fiber cords can be bundled or otherwise interconnected with one another to form bead cores 244 without an encapsulating matrix material. In other cases, the one or more carbon fiber cords can be encapsulated within a binder or matrix material 248. In the latter of such cases, bead cores 244 can have an outer surface 250. As shown in the exemplary arrangement in FIG. 7, bead cores 244 can be formed from a combination of one or more carbon fiber bundles or cords 246 and a binder or matrix material 248.

Additionally, bead cores 244 take the form of endless annular rings with outer surface or shape 250 extending, in cross-sectional profile, from a radially-inward profile end 252 toward a radially-outward profile end 254. In some cases, outer surface 250 can include opposing side surface portions 256 and 258 that extend at an angle relative to one another from an end surface portion 260 toward an outermost peripheral edge 262. In some cases, one or more of the side surface portions can have a substantially linear (e.g., approximately straight) cross-sectional profile. In other cases, one or more of side surface portions can have a curved cross-sectional profile, such as is shown in FIG. 7, for example. It will be appreciated, however, that any other suitable configuration and/or arrangement could alternately be used.

As discussed above, it will be appreciated that radial plies 144 can be anchored within bead areas 138 in any suitable manner. In the arrangements shown in FIGS. 2-7, outer ends 148 of radial plies 144 extend through openings (not numbered) formed by the bead reinforcing elements (e.g., bead reinforcing elements 140, 142, 174, 194, 216, 218 and 244) and are turned-up therearound. As such, it will be appreciated that portions of one or more plies (e.g., radial plies 144) can be disposed in abutting engagement along one or more portions of the bead reinforcing elements (e.g. outer surfaces 158, 160, 176, 196, 228, 230 and/or 250, side surface portions 166, 168, 182, 184, 202, 204, 236, 238, 256 and/or 258, and/or end surface portions 170, 186, 206, 240 and/or 260). Additionally, the portions of the one or more plies can be anchored or otherwise secured to the one or more portions of the bead reinforcing elements in any suitable manner, such as, for example, by way of a cured (e.g., vulcanized) material joint, an adhesive joint and/or a mechanical interconnection.

Alternate constructions are illustrated in FIGS. 8-13 in which bead areas 138' include bead reinforcing elements that are at least partially formed from carbon fibers. The embodiments shown in FIGS. 8-13 differ from those in FIGS. 2-7 at least in that the arrangements in FIGS. 8-13 illustrate radial plies 144' having outer ends 148' that are anchored or otherwise secured to the bead reinforcing elements without using outer ends that are turned-up around and extend radially-outwardly beyond the bead reinforcing elements. In preferred arrangements, such as those shown in FIGS. 8-13, outer ends, the outer ends of the radial plies can be anchored or otherwise secured to the bead reinforcing elements without utilizing an outer end that extends through the opening of the bead reinforcing element. Rather, outer ends 148' of radial plies 144' are shown as being anchored or otherwise secured to the bead reinforcing elements using other types of interconnections. As non-limiting examples, such anchoring interconnections can include securing a portion of the outer ends along a side surface portion or an end surface portion of the bead reinforcing elements, such as by using an adhesive joint, a mechanical connection, and/or by embedding, capturing or otherwise retaining a portion of the outer ends within the bead reinforcing elements.

Figure 8:
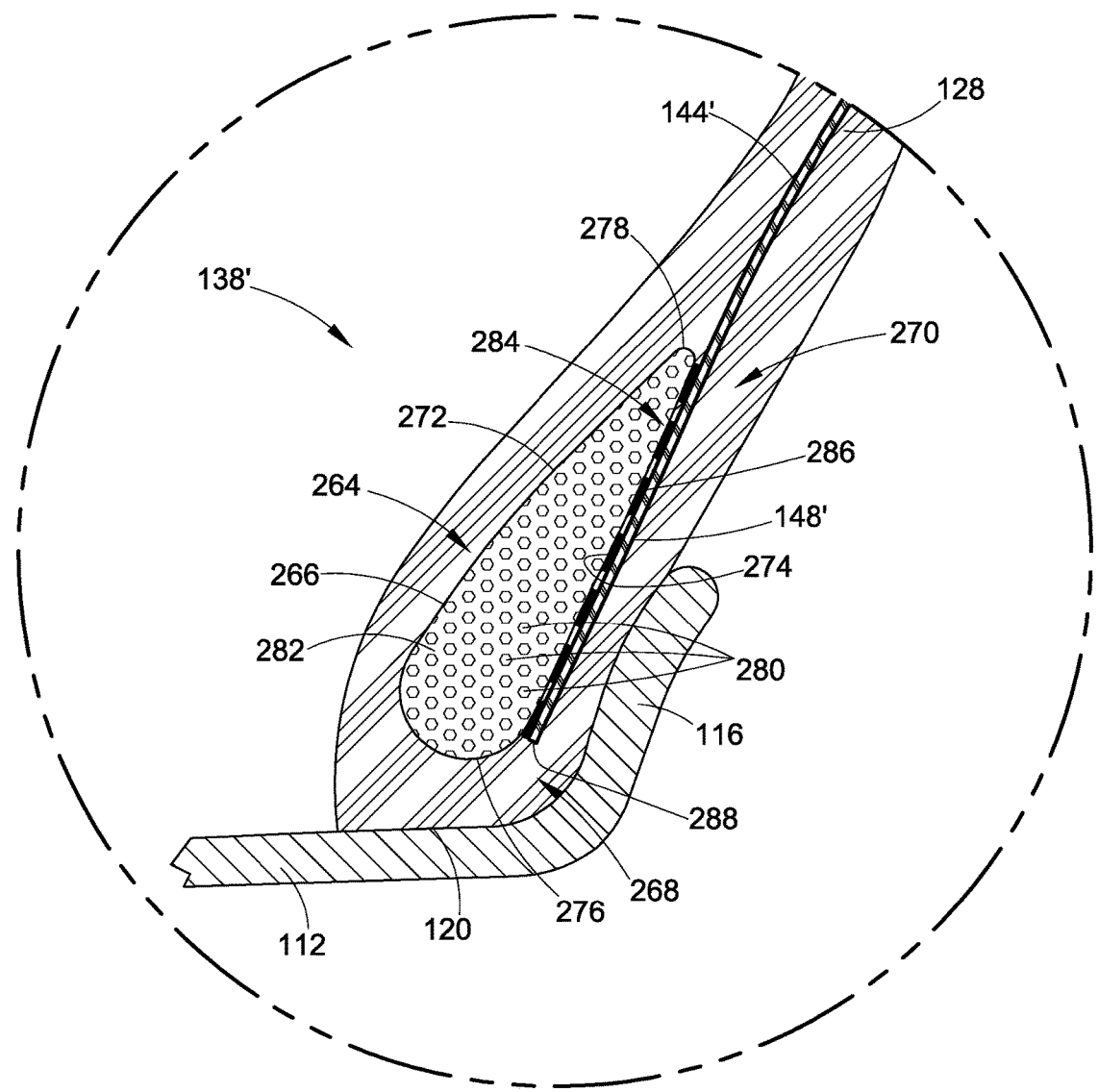
FIG. 8 is an enlarged view of the portion of the assembly in FIGS. 1-3 illustrating another example of a bead area including a bead reinforcing element in accordance with the subject matter of the present disclosure.

One example of an interconnection between a tire ply and a bead reinforcing element in accordance with the subject matter of the present disclosure is illustrated in FIG. 8 in which outer ends 148' of radial plies 144' extend into bead areas 138' (only one of which is shown in FIG. 8) and are anchored or otherwise secured to a bead reinforcing element that is at least partially formed from carbon fibers in accordance with the subject matter of the present disclosure. Bead areas 138' include bead cores 264 that take the form of endless annular rings with an outer surface or shape 266 extending, in cross-sectional profile, from a radially-inward profile end 268 toward a radially-outward profile end 270. In some cases, outer surface 266 can include an axially-inward side surface portion 272 and an axially-outward side surface portion 274 that extend at an angle relative to one another from an end surface portion 276 toward an outermost peripheral edge 278. As such, bead cores 264 are shown as having a teardrop-like cross-sectional shape, and it will be recognized that a separate bead filler is not shown as being included in the arrangement in FIG. 8. Rather, each of bead cores 264 can function as both a bead core and a bead filler.

Bead cores 264 can be formed from a plurality of carbon fibers arranged and/or configured in any of the forms discussed above in connection with bead cores 140, 174, 194, 216 and 244, and/or bead fillers 142 and/or 218, such as by including any one or more of a plurality of carbon fibers 280, which can be take the form of oriented and/or non-oriented carbon fibers, carbon fiber yarns and/or carbon fiber cords, in any combination, and can optionally include any additional reinforcing materials and/or elements, such as a binder or matrix material 282 and/or one or more reinforcing elements (not shown), such as one or more of reinforcing elements 214, for example, in any combination.

Additionally, in some cases, one or more of the side surface portions can have a substantially linear (e.g., approximately straight) cross-sectional profile. In other cases, one or more of side surface portions can have a curved cross-sectional profile, such as is shown in FIG. 8, for example. In either case, outer end 148' of radial ply 144' can be anchored or otherwise secured along axially-outward side surface portion 274 by way of a connection or joint 284, as is illustrated in FIG. 8. In a preferred arrangement, outer ends 148' can be secured to bead cores 264 without being attached to or extending along end surface portion 276 and/or axially-inward side surface portion 272. Also, it will be appreciated that any suitable type or kind of connection or joint could be used. As one non-limiting example, a cured-material (e.g., vulcanized) joint could be used in which material from outer end 148' and material from bead cores 264 are assembled together in an uncured condition and then subsequently cured to form a joint or connection suitable for withstanding conditions of use associated with a pneumatic tire. As another non-limiting example, an adhesive material joint could be used in which a bonding agent or other adhesive material 286 is disposed between the outer end 148' and a surface portion (e.g., surface portion 274) of bead core 264. The bonding agent or other adhesive material could be subsequently cured to at least partially form connection or joint 284. Also, outer end 148' is shown as terminating at a distal edge 288 that is disposed along axially-outward side surface portion 274 prior to extending through the opening (not numbered) formed by bead core 264. In other cases, however, the outer end could be anchored along at least a portion of one or more of end surface portion 276 and/or axially-inward side surface portion 272.

Figure 9:
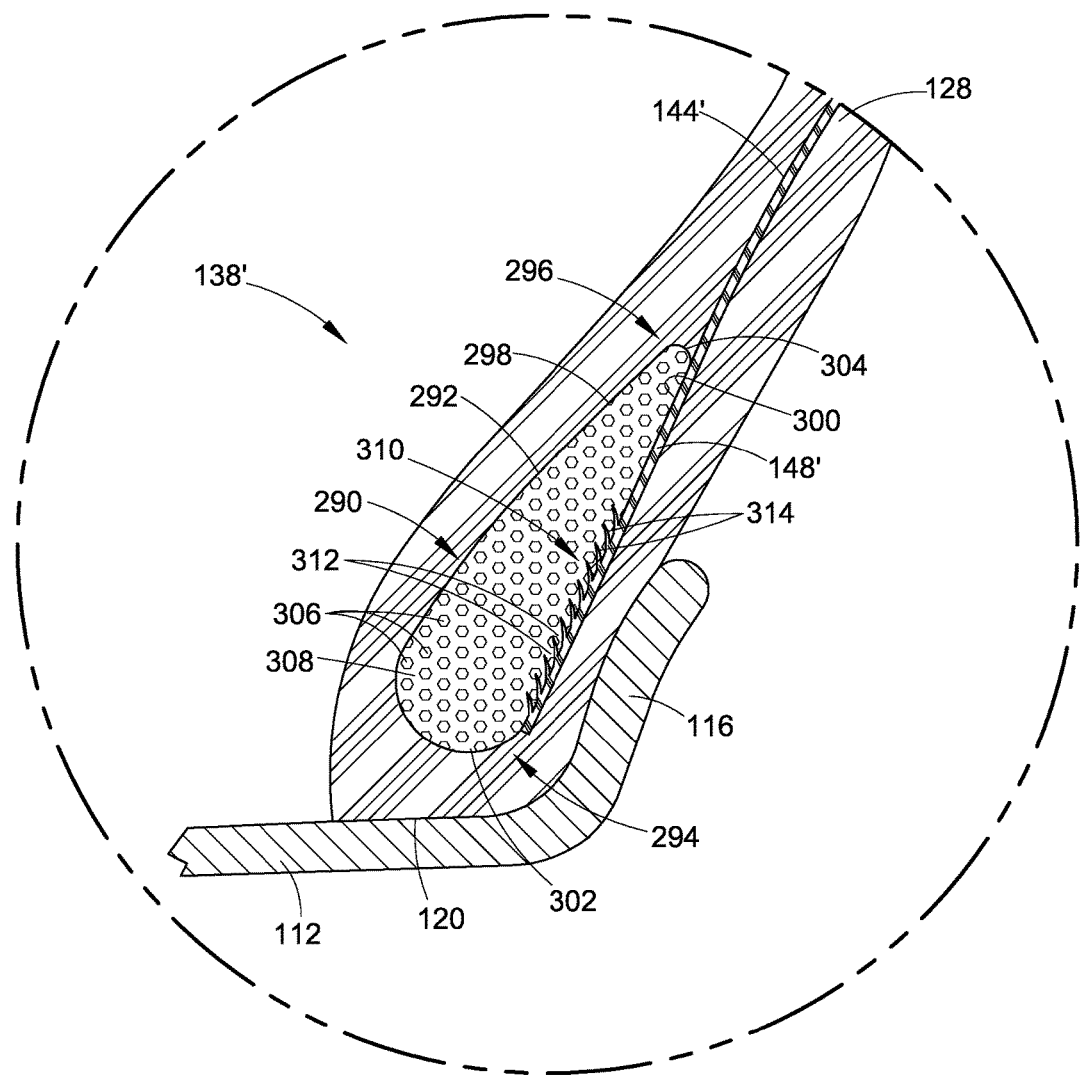
FIG. 9 is an enlarged view of the portion of the assembly in FIGS. 1-3 illustrating still another example of a bead area including a bead reinforcing element in accordance with the subject matter of the present disclosure.

Another example of an interconnection between a tire ply and a bead reinforcing element in accordance with the subject matter of the present disclosure is illustrated in FIG. 9 in which outer ends 148' of radial plies 144' extend into bead areas 138' (only one of which is shown in FIG. 9) and are anchored or otherwise secured to a bead reinforcing element that is at least partially formed from carbon fibers in accordance with the subject matter of the present disclosure. In FIG. 9, bead areas 138' include a bead core 290 that takes the form of endless annular rings with an outer surface or shape 292 extending, in cross-sectional profile, from a radially-inward profile end 294 toward a radially-outward profile end 296. In some cases, outer surface 292 can include an axially-inward side surface portion 298 and an axially-outward side surface portion 300 that extend at an angle relative to one another from an end surface portion 302 toward an outermost peripheral edge 304. As such, bead cores 290 are shown as having a teardrop-like cross-sectional shape, and it will be recognized that a separate bead filler is not shown as being included in the arrangement in FIG. 9. Rather, each of bead cores 290 can function as both a bead core and a bead filler.

Bead cores 290 can be formed from a plurality of carbon fibers arranged and/or configured in any of the forms discussed above in connection with bead cores 140, 174, 194, 216 and 244, and/or bead fillers 142 and/or 218, such as by including any one or more of a plurality of carbon fibers 306, which can be take the form of oriented and/or non-oriented carbon fibers, carbon fiber yarns and/or carbon fiber cords, in any combination, and can optionally include any additional reinforcing materials and/or elements, such as a binder or matrix material 308 and/or one or more reinforcing elements (not shown), such as one or more of reinforcing elements 214, for example, in any combination.

Additionally, in some cases, one or more of the side surface portions can have a substantially linear (e.g., approximately straight) cross-sectional profile. In other cases, one or more of side surface portions can have a curved cross-sectional profile, such as is shown in FIG. 9, for example. In either case, outer end 148' of radial ply 144' can be anchored or otherwise secured along axially-outward side surface portion 300 by way of a connection or joint 310, such as is shown in FIG. 9, for example. In a preferred arrangement, outer ends 148' can be secured to bead cores 290 without utilizing or otherwise extending along end surface portion 302 and/or axially-inward side surface portion 298.

It will also be appreciated that any suitable type or kind of configuration, arrangement and/or construction could be used to form joint 310. As one non-limiting example, a mechanical interconnection could be used in which one or more securement features 312 are formed along at least a portion of axially-outward side surface portion 300. In such cases, the one or more securement features can extend peripherally around or otherwise along at least a portion of at least the axially-outward side surface portion. Additionally, in such cases, the mechanical connection could include one or more securement features 314 formed along at least a portion of outer end 148' of radial ply 144'. In a preferred arrangement, securement features 312 and 314 can be cooperative with one another such that the securement features can interengage one another to at least partially anchor or otherwise secured outer ends 148' on or along bead cores 290. It will be appreciated that cooperative securement features of any suitable type, kind and/or configuration can be used. As one example, securement features 312 can include a plurality of grooves and/or projections that are spaced radially along axially-outward side surface portion 300, and can extend peripherally along or otherwise around at least a portion of the axially-outward side surface portion. In such case, securement features 314 can include a plurality of corresponding projections and/or grooves that can abuttingly interengage one another.

Figure 10:
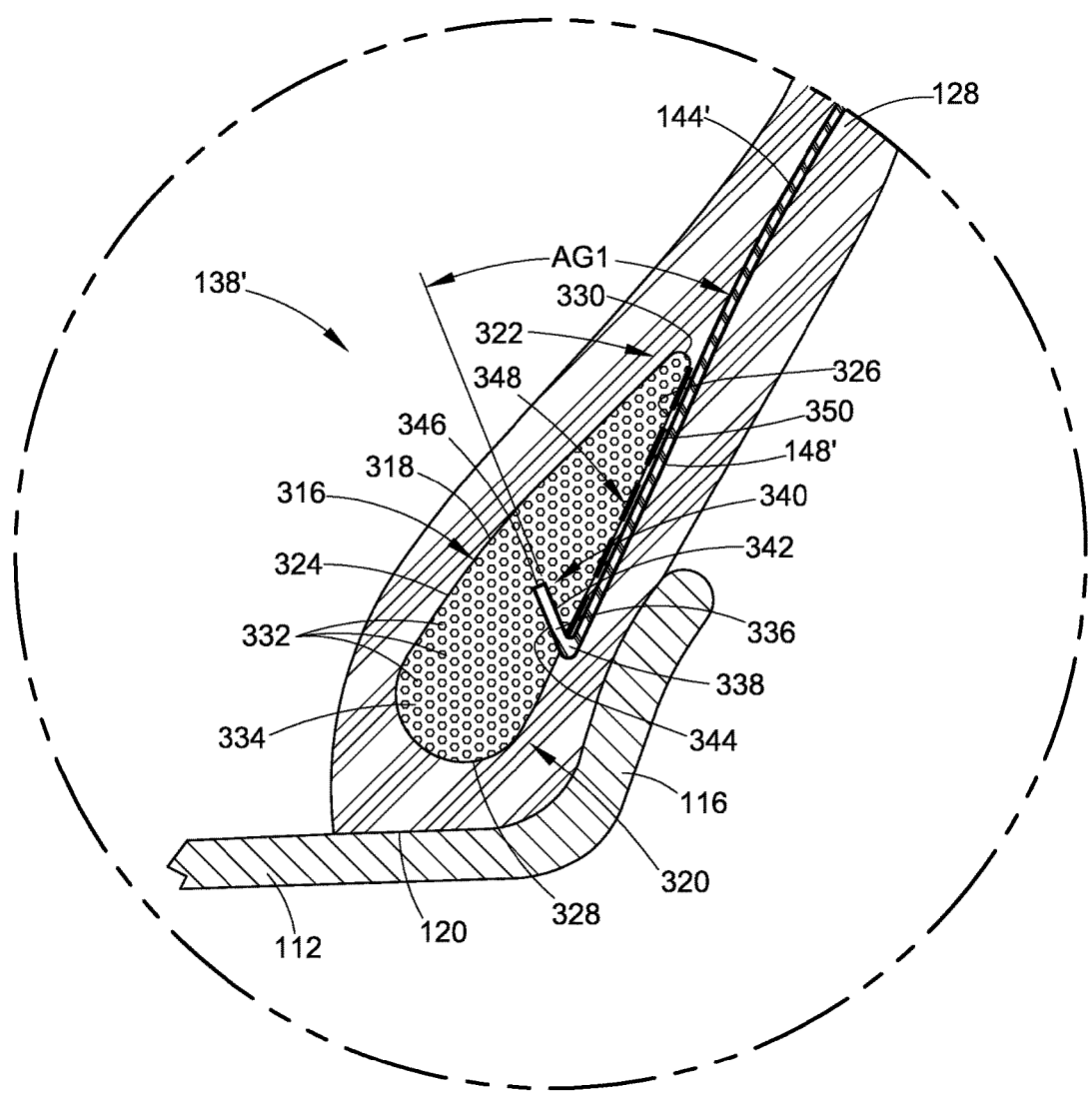
FIG. 10 is an enlarged view of the portion of the assembly in FIGS. 1-3 illustrating yet another example of a bead area including a bead reinforcing element in accordance with the subject matter of the present disclosure.

Still another example of an interconnection between a tire ply and a bead reinforcing element in accordance with the subject matter of the present disclosure is illustrated in FIG. 10 in which outer ends 148' of radial plies 144' extend into bead areas 138' (only one of which is shown in FIG. 10) and are anchored or otherwise secured to a bead reinforcing element that is at least partially formed from carbon fibers in accordance with the subject matter of the present disclosure. Bead areas 138' include bead cores 316 that take the form of endless annular rings with an outer surface or shape 318 extending, in cross-sectional profile, from a radially-inward profile end 320 toward a radially-outward profile end 322. In some cases, outer surface 318 can include an axially-inward side surface portion 324 and an axially-outward side surface portion 326 that extend at an angle relative to one another from an end surface portion 328 toward an outermost peripheral edge 330. As such, bead cores 316 are shown as having a teardrop-like cross-sectional shape, and it will be recognized that a separate bead filler is not shown as being included in the arrangement in FIG. 10. Rather, each of bead cores 316 can function as both a bead core and a bead filler.

Bead cores 316 can be formed from a plurality of carbon fibers arranged and/or configured in any of the forms discussed above in connection with bead cores 140, 174, 194, 216 and 244, and/or bead fillers 142 and/or 218, such as by including any one or more of a plurality of carbon fibers 332, which can be take the form of oriented and/or non-oriented carbon fibers, carbon fiber yarns and/or carbon fiber cords, in any combination, and can optionally include any additional reinforcing materials and/or elements, such as a binder or matrix material 334 and/or one or more reinforcing elements (not shown), such as one or more of reinforcing elements 214, for example, in any combination.

Additionally, in some cases, one or more of the side surface portions can have a substantially linear (e.g., approximately straight) cross-sectional profile. In other cases, one or more of side surface portions can have a curved cross-sectional profile, such as is shown in FIG. 10, for example. In either case, outer end 148' of radial ply 144' can be anchored or otherwise secured on or along bead core 316 by extending at least a portion of the outer end into the bead core. It will be appreciated that such a construction can be of any suitable configuration and/or arrangement.

As one example, a distal portion of radial ply 144' along outer end 148' can be formed into an annular flange 336 that can extend peripherally about axis AX (FIG. 1) and can be disposed at an angle AG1 relative to an adjacent portion of the radial ply, such as from along a corner or transition portion 338 of the radial ply, for example. It will be appreciated that flange 336 can project from another portion of outer end 148' in any suitable manner. For example, angle AG1 can have a value within a range of from approximately 5 degrees to approximately 175 degrees. In a more preferred example, angle AG1 can have a value within a range of from approximately 15 degrees to approximately 120 degrees. And, in an even more preferred example, angle AG1 can have a value within a range of from approximately 30 degrees to approximately 75 degrees.

It will be appreciated that flange 336 can be formed or otherwise provided on or along radial ply 144' in any suitable manner. For example, the flange could be formed on or along the outer end of the radial ply using additional material that is secured on or along the radial ply, such as one or more sections of additional material (e.g., one or more additional layer or plies) and/or one or more quantities of flowable material (e.g., one or more molded, cast or otherwise formed materials). As another example, flange 336 can be integrally formed with radial ply 144', by folding or otherwise forming a portion of radial ply 144' along outer end 148' in an axially-inward direction. In some cases, additional materials and/or compounds could be applied on or along the portion of the radial ply to provide added strength, rigidity and/or robustness to flange 336 and/or outer end 148'.

In the present example, annular flange 336 is shown as being at least partially received within bead core 316, such as from along axially-outward side surface portion 326. It will be appreciated that at least a portion of radial ply 144' and/or one or more features thereof (e.g., annular flange 336) can be at least partially received within the bead core in any suitable manner. As one example, at least a portion of the annular flange could be embedded or otherwise encapsulated within the bead core, such as may result from the bead core being formed or otherwise manufactured around or otherwise over at least a portion of the annular flange. As another example, an annular groove or slot 340 can extend into bead core 316 from along one or more surface portions thereof, and the annular flange can be inserted into the annular slot during assembly of the pneumatic tire. In the arrangement illustrated in FIG. 10, annular slot 340 extends into the bead core from along axially-outward side surface portion 326. Annular slot 340 is shown as including opposing side surfaces 342 and 344 that at least partially define a slot width (not identified) and is shown as extending axially-inward into the bead core to a distal end surface 346 that at least partially defines a slot depth (not identified).

Additionally, in some cases, at least a portion of outer ends 148' can be secured to bead cores 316 such as by way of a connection or joint 348. As one non-limiting example, a cured-material (e.g., vulcanized) joint could be used in which material from outer end 148' and material from bead cores 316 are assembled together in an uncured condition and then subsequently cured to form a joint or connection suitable for withstanding conditions of use associated with a pneumatic tire. As another non-limiting example, an adhesive material joint could be used in which a bonding agent or other adhesive material 350 is disposed between the outer end 148' and a surface portion (e.g., axially-outward side surface portion 326) of bead core 316. The bonding agent or other adhesive material could be subsequently cured to at least partially form connection or joint 348.

Figure 11:
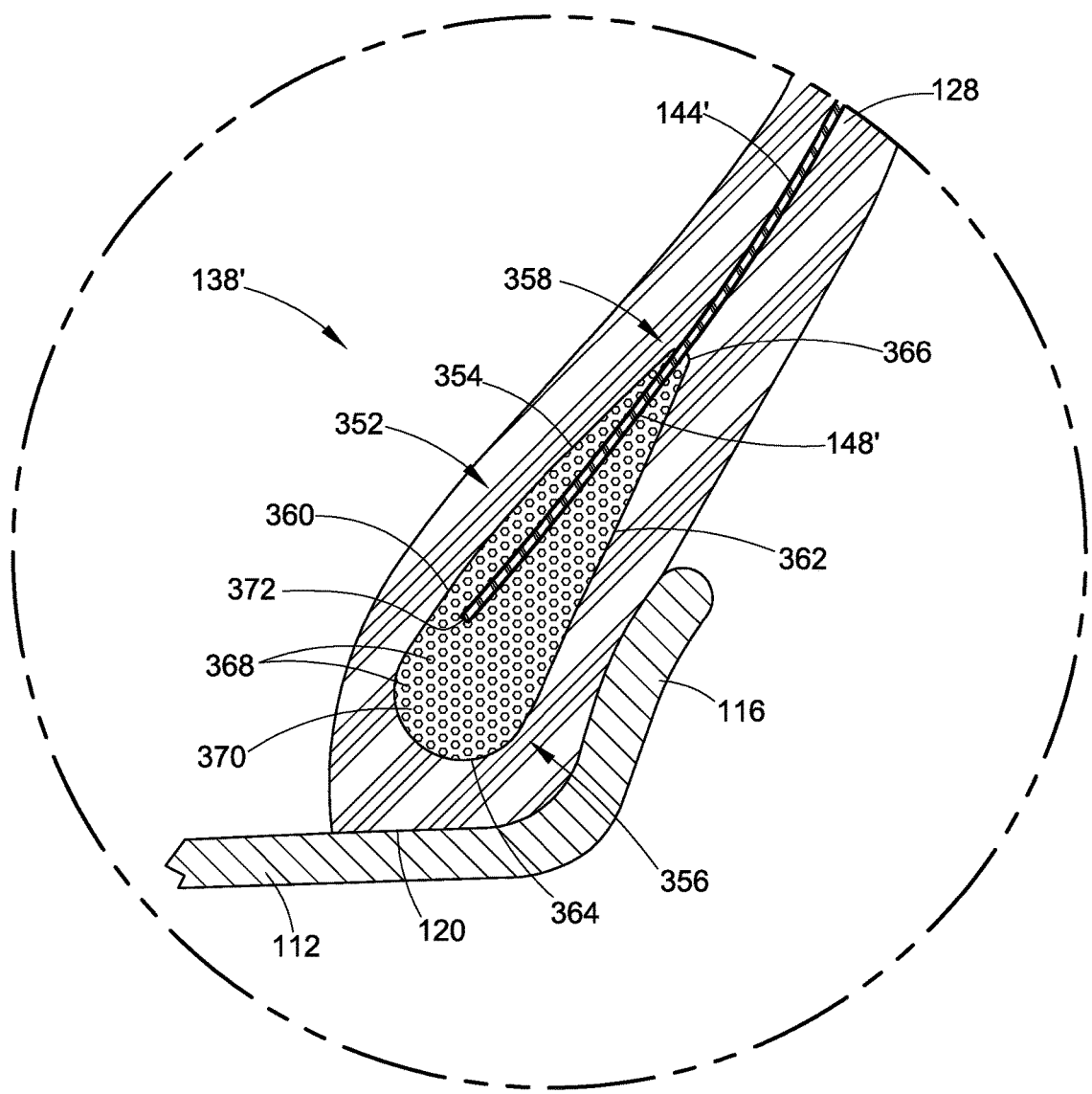
FIG. 11 is an enlarged view of the portion of the assembly in FIGS. 1-3 illustrating a further example of a bead area including a bead reinforcing element in accordance with the subject matter of the present disclosure.

Yet another example of an interconnection between a tire ply and a bead reinforcing element in accordance with the subject matter of the present disclosure is illustrated in FIG. 11 in which outer ends 148' of radial plies 144' extend into bead areas 138' (only one of which is shown in FIG. 11) and are anchored or otherwise secured to a bead reinforcing element that is at least partially formed from carbon fibers in accordance with the subject matter of the present disclosure. Bead areas 138' include bead cores 352 that take the form of endless annular rings with an outer surface or shape 354 extending, in cross-sectional profile, from a radially-inward profile end 356 toward a radially-outward profile end 358. In some cases, outer surface 354 can include an axially-inward side surface portion 360 and an axially-outward side surface portion 362 that extend at an angle relative to one another from an end surface portion 364 toward an outermost peripheral edge 366. As such, bead cores 352 are shown as having a teardrop-like cross-sectional shape, and it will be recognized that a separate bead filler is not shown as being included in the arrangement in FIG. 11. Rather, each of bead cores 352 can function as both a bead core and a bead filler.

Bead cores 352 can be formed from a plurality of carbon fibers arranged and/or configured in any of the forms discussed above in connection with bead cores 140, 174, 194, 216 and 244, and/or bead fillers 142 and/or 218, such as by including any one or more of a plurality of carbon fibers 368, which can be take the form of oriented and/or non-oriented carbon fibers, carbon fiber yarns and/or carbon fiber cords, in any combination, and can optionally include any additional reinforcing materials and/or elements, such as a binder or matrix material 370 and/or one or more reinforcing elements (not shown), such as one or more of reinforcing elements 214, for example, in any combination.

Additionally, in some cases, one or more of the side surface portions can have a substantially linear (e.g., approximately straight) cross-sectional profile. In other cases, one or more of side surface portions can have a curved cross-sectional profile, such as is shown in FIG. 11, for example. In either case, outer end 148' of radial ply 144' can be anchored or otherwise secured on or along bead core 352 by extending at least a portion of the outer end into the bead core. It will be appreciated that such a construction can be of any suitable configuration and/or arrangement.

As one example, outer end 148' of radial ply 144' can terminate at a distal edge 372 that can extend peripherally about axis AX and at least a portion of outer end 148' of radial ply 144' adjacent distal edge 372 can be at least partially received within bead core 352, such as from along outermost peripheral edge 366, for example. It will be appreciated that at least a portion of radial ply 144' can be at least partially received within the bead core in any suitable manner. As one example, at least a portion of outer end 148' could be embedded or otherwise encapsulated within the bead core, such as may result from the bead core being formed or otherwise manufactured around or otherwise over at least a portion of the radial ply. It will be appreciated, however, that other assembly techniques could alternately be used.

Figure 12:
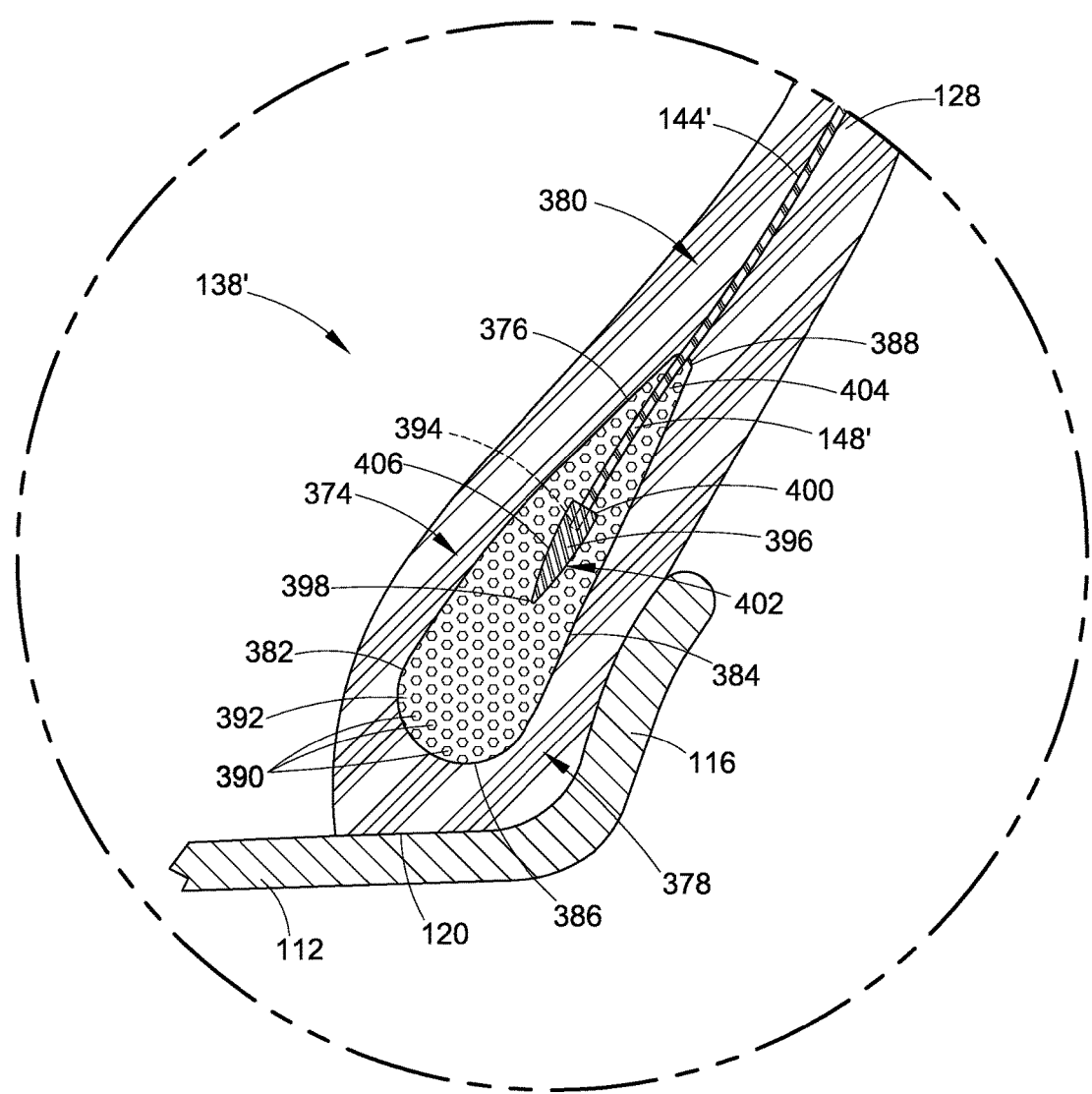
FIG. 12 is an enlarged view of the portion of the assembly in FIGS. 1-3 illustrating still a further example of a bead area including a bead reinforcing element in accordance with the subject matter of the present disclosure.

A further example of an interconnection between a tire ply and a bead reinforcing element in accordance with the subject matter of the present disclosure is illustrated in FIG. 12 in which outer ends 148' of radial plies 144' extend into bead areas 138' (only one of which is shown in FIG. 12) and are anchored or otherwise secured to a bead reinforcing element that is at least partially formed from carbon fibers in accordance with the subject matter of the present disclosure. Bead areas 138' include bead cores 374 that take the form of endless annular rings with an outer surface or shape 376 extending, in cross-sectional profile, from a radially-inward profile end 378 toward a radially-outward profile end 380. In some cases, outer surface 376 can include an axially-inward side surface portion 382 and an axially-outward side surface portion 384 that extend at an angle relative to one another from an end surface portion 386 toward an outermost peripheral edge 388. As such, bead cores 374 are shown as having a teardrop-like cross-sectional shape, and it will be recognized that a separate bead filler is not shown as being included in the arrangement in FIG. 12. Rather, each of bead cores 374 can function as both a bead core and a bead filler.

Bead cores 374 can be formed from a plurality of carbon fibers arranged and/or configured in any of the forms discussed above in connection with bead cores 140, 174, 194, 216 and 244, and/or bead fillers 142 and/or 218, such as by including any one or more of a plurality of carbon fibers 390, which can be take the form of oriented and/or non-oriented carbon fibers, carbon fiber yarns and/or carbon fiber cords, in any combination, and can optionally include any additional reinforcing materials and/or elements, such as a binder or matrix material 392 and/or one or more reinforcing elements (not shown), such as one or more of reinforcing elements 214, for example, in any combination.

Additionally, in some cases, one or more of the side surface portions can have a substantially linear (e.g., approximately straight) cross-sectional profile. In other cases, one or more of side surface portions can have a curved cross-sectional profile, such as is shown in FIG. 12, for example. In either case, outer end 148' of radial ply 144' can be anchored or otherwise secured on or along bead core 374 by extending at least a portion of the outer end and one or more securement features formed thereon into the bead core. It will be appreciated that such a construction can be of any suitable type, kind, configuration and/or arrangement.

As one example, outer end 148' of radial ply 144' can terminate at a distal edge 394 that can extend peripherally about axis AX, and a securement bead 396 can be secured along outer end 148' of the radial ply adjacent distal edge 394. In some cases, securement bead 396 can substantially encapsulate distal edge 394, and can include a radially-inward edge 398 and a radially-outward end surface 400. It will be appreciated that securement bead 396 can be formed or otherwise provided on or along outer end 148' of radial ply 144' in any suitable manner. For example, the securement bead could be formed on or along the outer end of the radial ply using additional material that is secured on or along the radial ply, such as one or more sections of additional material (e.g., one or more additional layer or plies) and/or one or more quantities of flowable material (e.g., one or more molded, cast or otherwise formed materials). As another example, the securement bead could be integrally formed with radial ply 144', by folding or otherwise forming a portion of radial ply 144' along outer end 148' to at least partially create the securement bead. In some cases, additional materials and/or compounds could be applied on or along the portion of the radial ply to provide added strength, rigidity, robustness and/or to maintain the shape of the securement bead.

Additionally, it will be recognized that securement bead 396 is shown as being at least partially received within bead core 374, such as from along outermost peripheral edge 388. It will be appreciated that at least a portion of radial ply 144' and/or one or more features thereof (e.g., securement bead 396) can be at least partially received within the bead core in any suitable manner. As one example, at least a portion of the outer end and the securement bead could be embedded or otherwise encapsulated within the bead core, such as may result from the bead core being formed or otherwise manufactured around or otherwise over at least a portion of the outer end and the securement bead. As another example, an annular groove or slot 402 can extend into bead core 374 from along one or more surface portions thereof, and the securement bead as well as at least a portion of the outer end of the radial ply can be inserted into the annular slot during assembly of the pneumatic tire.

In the arrangement illustrated in FIG. 12, annular slot 402 extends into the bead core from along outermost peripheral edge 388. Annular slot 402 is shown as including an outer portion 404 and an inner portion 406. In some cases, outer portion 404 can have an elongated length (not identified) and a width (not identified) dimensioned to abuttingly engage at least a portion of outer end 148' of radial ply 144'. Additionally, in some cases, inner portion 406 can at least partially form an annular cavity dimensioned to receive and retain securement bead 396. As such, in some cases, inner portion 406 can have a width (not identified) that is greater than the width of outer portion 404 such that radially-outward end surface 400 of securement bead 396 can be received and retained within the inner portion of the annular slot. During assembly, outer portion 404 can be separated to allow securement bead 396 to pass into the inner portion 406. In such cases, it will be appreciated that further assembly of the pneumatic tire will generally result in outer portion 404 abuttingly engaging outer end 148' of radial ply 144' and thereby capture securement bead 396 within the annular slot.

Figure 13:
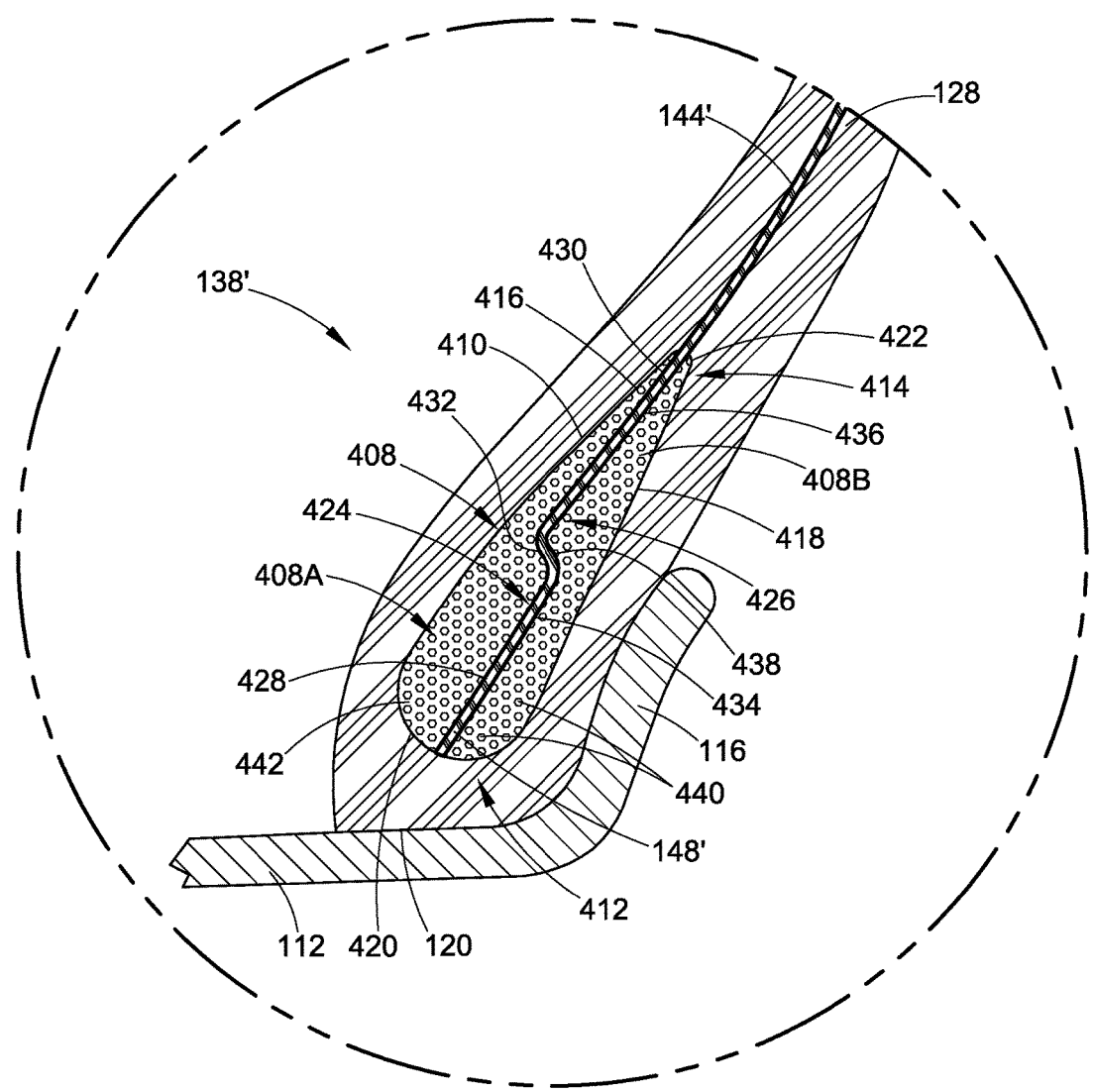
FIG. 13 is an enlarged view of the portion of the assembly in FIGS. 1-3 illustrating still yet a further example of a bead area including a bead reinforcing element in accordance with the subject matter of the present disclosure.

Still a further example of an interconnection between a tire ply and a bead reinforcing element in accordance with the subject matter of the present disclosure is illustrated in FIG. 13 in which outer ends 148' of radial plies 144' extend into bead areas 138' (only one of which is shown in FIG. 13) and are anchored or otherwise secured to a bead reinforcing element that is at least partially formed from carbon fibers in accordance with the subject matter of the present disclosure. Bead areas 138' include bead cores 408 that, in an assembled condition, take the form of endless annular rings with an outer surface or shape 410 extending, in cross-sectional profile, from a radially-inward profile end 412 toward a radially-outward profile end 414. In some cases, outer surface 410 can include an axially-inward side surface portion 416 and an axially-outward side surface portion 418 that extend at an angle relative to one another from an end surface portion 420 toward an outermost peripheral edge 422. As such, bead cores 408 are shown as having a teardrop-like cross-sectional shape, and it will be recognized that a separate bead filler is not shown as being included in the arrangement in FIG. 13. Rather, each of bead cores 408, in an assembled condition, can function as both a bead core and a bead filler.

Bead cores 408 differ from other bead cores shown and described herein in that bead cores 408 are formed from a plurality of core sections that, in an assembled condition, can capture at least a portion of outer end 148' and thereby anchor radial ply 144' within bead areas 138'. It will be appreciated that any suitable configuration, arrangement and/or quantity of two or more core sections could be used to form bead cores 408. In the arrangement shown in FIG. 13, for example, bead core 408 is shown as including an axially-inward core section 408A and an axially-outward core section 408B. Axially-inward core section 408A includes a side surface 424 disposed opposite axially-inward side surface portion 416 and axially-outward core section 408B includes a side surface 426 disposed opposite axially-outward side surface portion 418.

It will be appreciated that side surfaces 424 and 426 can be of any suitable shape and/or configuration. In a preferred arrangement, however, side surfaces 424 and 426 are cooperative with one another to form a securement feature for engaging and retaining at least a portion of outer end 148' and thereby anchoring radial ply 144' within bead areas 138'. As one example of a suitable configuration, the side surface of one core section could include one or more annular grooves and the side surface of another core section could include one or more projections that are cooperatively aligned with one or more of the annular grooves. As another example of a suitable construction, side surface 424 is shown in FIG. 13 as including a surface portion 428 disposed toward end 412 and a surface portion 430 that is disposed toward end 414. Surface portions 428 and 430 are offset from one another such that a shoulder surface portion 432 is formed along core section 408A. Side surface 426 of core section 408B is shown as including a cooperative construction in which the side surface includes a surface portion 434 that is disposed toward end 412 and a surface portion 436 that is disposed toward end 414. Surface portions 434 and 436 are offset from one another such that a shoulder surface portion 438 is formed along core section 408B.

During assembly, core sections 408A and 408B can be provided separately and positioned on or along opposing sides of radial ply 144', such as along outer end 148' thereof. In such cases, it will be appreciated that further assembly of the pneumatic tire will generally result in side surfaces 424 and 426 abuttingly engaging outer end 148'. Accordingly, the offset configuration of side surfaces 424 and 424 together with shoulder surface portions 432 and 438 respectively formed therealong can function to capture at least a portion of outer end 148' and thereby retain radial ply 144' within bead areas 138'.

Bead cores 408, as well as any one or more core sections thereof, can be formed from a plurality of carbon fibers arranged and/or configured in any of the forms discussed above in connection with bead cores 140, 174, 194, 216 and 244, and/or bead fillers 142 and/or 218, such as by including any one or more of a plurality of carbon fibers 440, which can be take the form of oriented and/or non-oriented carbon fibers, carbon fiber yarns and/or carbon fiber cords, in any combination, and can optionally include any additional reinforcing materials and/or elements, such as a binder or matrix material 442 and/or one or more reinforcing elements (not shown), such as one or more of reinforcing elements 214, for example, in any combination.

A bead reinforcing element in accordance with the subject matter of the present disclosure, such as any one or more of bead cores 140, 174, 194, 216, 244, 264, 290, 316, 352, 374 and/or 408, and/or any one or more of bead fillers 142 and/or 218, for example, can include one or more features or treatments along at least a portion of the outer surface thereof, such as, for example, to promote or otherwise improve adhesion and/or interengagement of the bead reinforcing element with the encapsulating plies and/or other materials that form or are otherwise included along the bead areas of the pneumatic tire.

Figure 14:
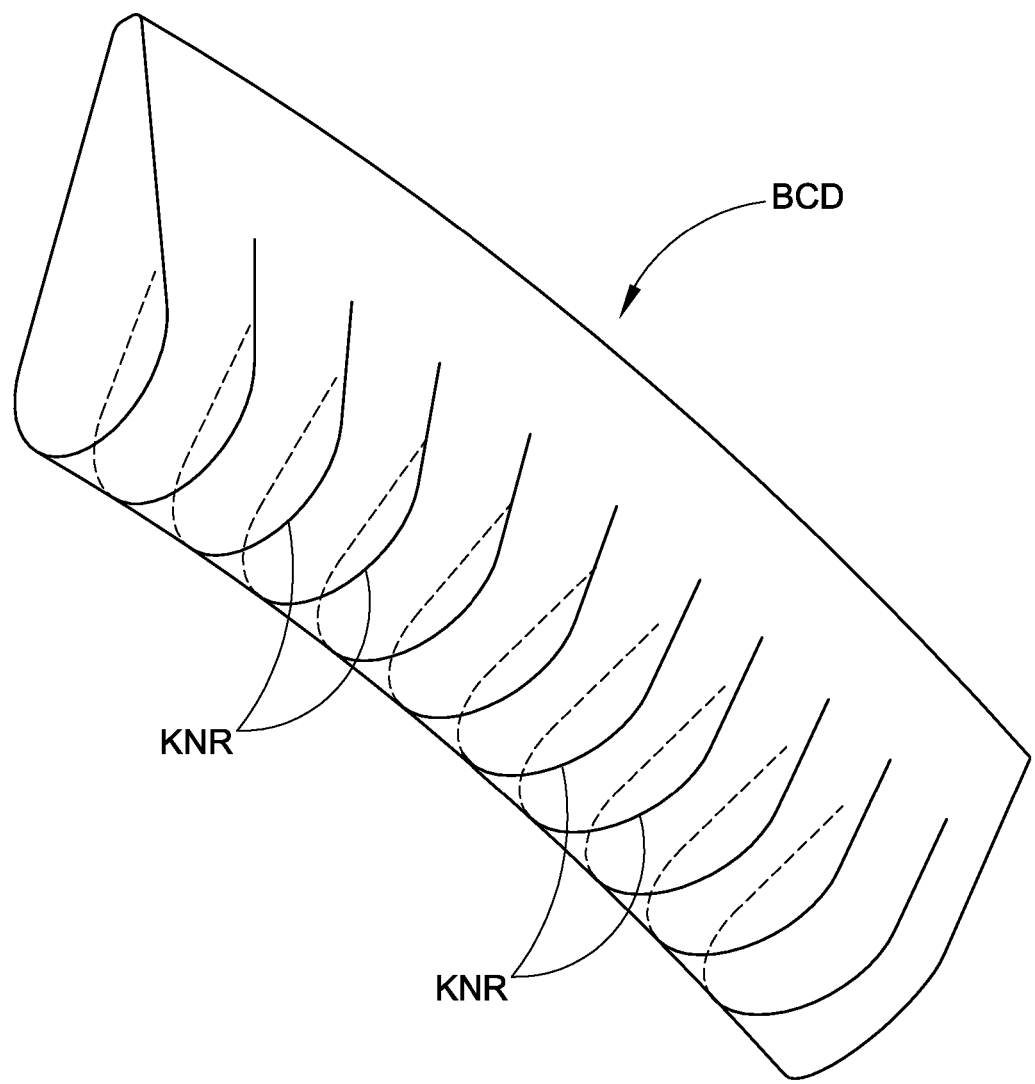
FIG. 14 is a perspective view of a section of an exemplary bead reinforcing element in accordance with the subject matter of the present disclosure with a surface treatment represented along the exterior thereof.

One example of such a treatment is illustrated in FIG. 14, which shows a bead core BDC, which is representative of any one or more of bead cores 140, 174, 194, 216, 244, 264, 290, 316, 352, 374 and/or 408, and/or any one or more of bead fillers 142 and/or 218, and is shown with physical features formed into the outer surface thereof that are configured and dimensioned to receive and engage encapsulating plies or other material of the bead areas. Examples of suitable surface treatments can include roughening (e.g., knurling and/or etching) a previously formed area, or forming features that extend into and/or out of an area during manufacture, such as by using a suitable mold or die set, for example. In the arrangement shown in FIG. 14, radially-extending knurls or grooves KNR are formed on or along a portion of the representative bead reinforcing element. It will be appreciated, however, that any such surface treatment, if provided, can be included on or along any one or more portions, sections and/or areas of the bead reinforcing elements, whether contiguous or non-contiguous.

Additionally, or in the alternative, a bead reinforcing element in accordance with the subject matter of the present disclosure, such as any one or more of bead cores 140, 174, 194, 216, 244, 264, 290, 316, 352, 374 and/or 408, and/or any one or more of bead fillers 142 and/or 218, for example, can include adhesive material included within, on or along the bead reinforcing element. In some cases, the adhesive material could take the form of a matrix material that is included as a part of the bead reinforcing element, such as during a manufacturing process. In other cases, the adhesive material may be applied on or along an area, section or surface of the bead reinforcing element. In such cases, the adhesive material is preferably compatible with the matrix material of the bead reinforcing element as well as the rubber or other material from which the one or more radial or body plies of the elastomeric casing are formed.

Figure 15:
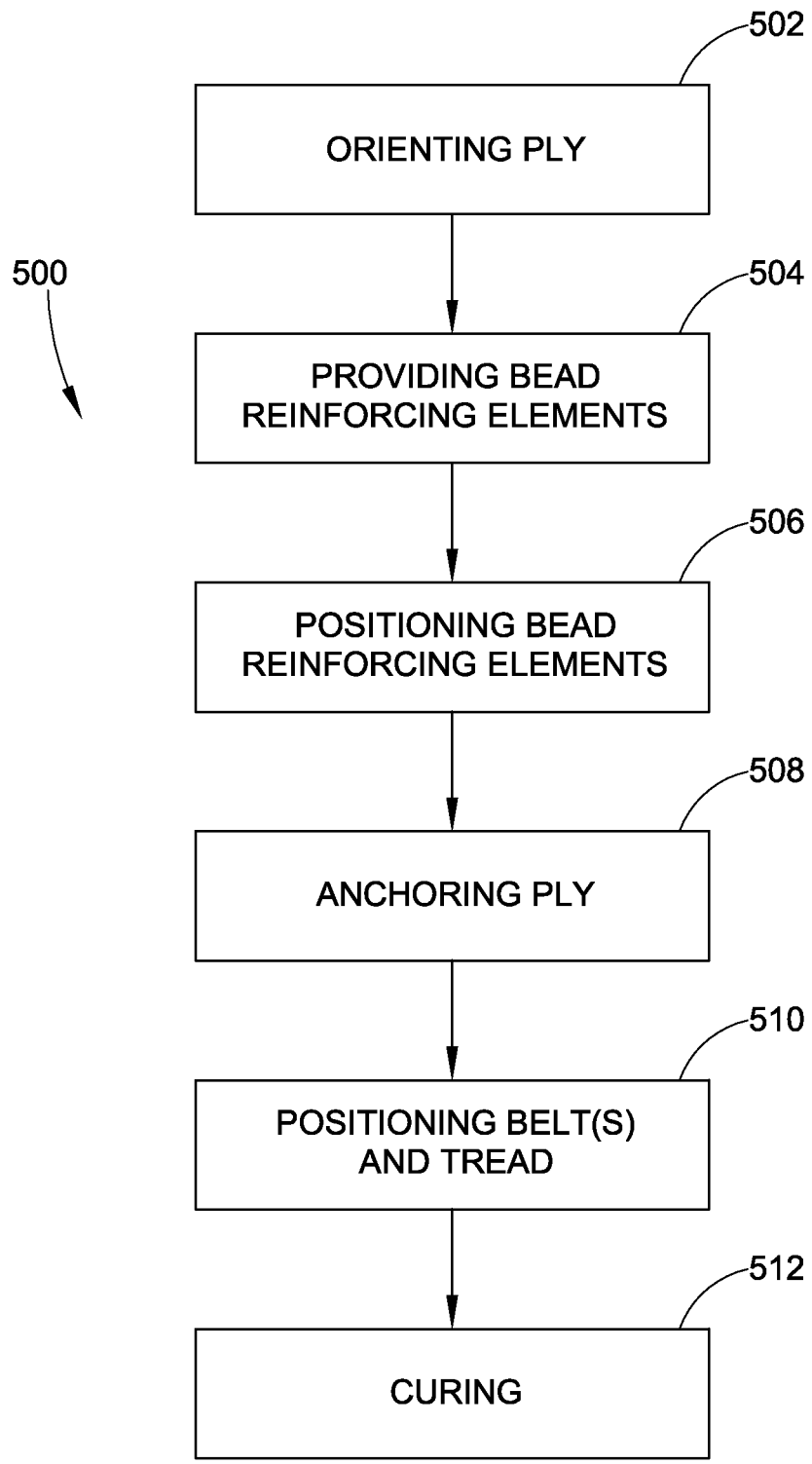
FIG. 15 is a graphical representation of one example of a method of manufacturing a pneumatic tire in accordance with the subject matter of the present disclosure.

One example of a method 500 of manufacturing a pneumatic tire in accordance with the subject matter of the present disclosure is graphically represented in FIG. 15 as including an action of orienting at least one layer or ply of material along an associated tire building drum or other suitable assembly device, as is represented in FIG. 15 by item number 502. Generally, the at least one layer of material will include one or more layers of rubber material and/or one or more layers of rubber composite material (e.g., cord-reinforced rubber plies). As one example, the at least one layer of material can include an inner liner, one or more body plies that can include reinforcing cords, and/or sidewalls. Method 500 can also include providing one or more bead reinforcing elements that are at least partially formed from or otherwise include a plurality of carbon fibers, such as any one or more of bead cores 140, 174, 194, 216, 244, 264, 290, 316, 352, 374 and/or 408, and/or any one or more of bead fillers 142 and/or 218, for example, as is represented in FIG. 15 by item number 504. In practice, two bead cores are typically provided.

Method 500 can further include positioning the bead reinforcing elements along the at least one layer of material, as is represented by item number 506. In practice, two bead reinforcing elements are positioned along the at least one layer of material in spaced relation to one another. The method 500 can also include anchoring the at least one layer of material to, around or otherwise along the bead reinforcing elements, as is represented in FIG. 15 by item number 508. It will be appreciated that such an action can be achieved by any one or more of the constructions shown and described herein in connection with FIGS. 1-14. As one example, such an action can be achieved by attaching, embedding or otherwise capturing the at least one layer of material to or in the bead reinforcing elements. In other cases, such an action can be achieved by turning up or otherwise folding a portion of the at least one layer of material back over the bead reinforcing element to at least partially encapsulate the same. The latter of such actions are commonly referred to in the art as "turn up" operations, and are performed along each end of the at least one layer of material to at least partially encapsulate each of the bead reinforcing elements.

Method 500 can further include positioning a belt package and tread along the at least one layer of material to at least partially form and uncured tire assembly, as is represented in FIG. 15 by item number 510. In practice, the belt package and tread are positioned along the at least one layer of material between the bead reinforcing elements. Method 500 can also include curing the uncured tire assembly using one or more suitable curing processes to form a pneumatic tire, as is represented by item number 512.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as the same come within the scope of the appended claims and any equivalents thereof.

The invention claimed is:

1. A pneumatic tire having an axis of rotation, said pneumatic tire comprising:
 an elastomeric tire casing extending circumferentially about said axis of rotation and including a crown portion extending in a generally axial direction, opposing sidewalls disposed in axially-spaced relation to one another and extending radially inwardly from along said crown portion to respective bead areas, a single ply extending across said crown portion and along said sidewalls, and a plurality of bead reinforcing elements in the form of endless annular rings with a single bead reinforcing element embedded within each of said bead areas, said ply including opposing outer ends with one of said outer ends disposed within each of said bead areas;
 said plurality of bead reinforcing elements each having a cross-sectional shape with a first profile end having a first cross-sectional dimension and a second profile end disposed radially outward of said first profile end, said second profile end having a second cross-sectional dimension that is less than said first cross-sectional dimension such that said plurality of bead reinforcing elements operate as a bead core and bead filler combination in a single integral component within said bead areas of said elastomeric tire casing;
 said plurality of bead reinforcing elements each defining an opening extending therethrough, said plurality of bead reinforcing elements extending peripherally about said axis and having an axially-inward side and an axially-outward side relative to said sidewalls of said elastomeric tire casing with one of said opposing outer ends of said ply anchored to one of said plurality of bead reinforcing elements along-said only said axially-outward side thereof; and,
 said plurality of bead reinforcing elements being formed from a plurality of carbon fibers embedded within a matrix material.

2. A pneumatic tire according to claim 1, wherein each of said outer ends of said ply extends along said axially-outward side of a respective one of said bead reinforcing elements and is secured therealong using a mechanical connection.

3. A pneumatic tire according to claim 2, wherein said outer ends of said ply include a plurality of securement features formed therealong, and said axially-outward side of said bead reinforcing elements includes a plurality of securement features cooperative with said plurality of securement features of said outer ends to at least partially form said mechanical connection.

4. A pneumatic tire according to claim 1, wherein said plurality of carbon fibers of one of said plurality of bead reinforcing elements are in the form of individual carbon fibers.

5. A pneumatic tire according to claim 4, wherein said individual carbon fibers in said one of said plurality of bead reinforcing elements are arranged in an aligned orientation relative to one another.

6. A pneumatic tire according to claim 1, wherein said plurality of carbon fibers of one of said plurality of bead reinforcing elements are in the form of elongated carbon fiber yarns.

7. A pneumatic tire according to claim 1, wherein said plurality of carbon fibers of one of said plurality of bead reinforcing elements are in the form of elongated carbon fiber cords.

8. A pneumatic tire according to claim 1, wherein said bead reinforcing elements include a plurality of annular grooves formed thereinto along said axially-outward side thereof, and said outer ends of said ply including a plurality of annular projections operatively engaging said plurality of annular grooves forming mechanical interconnections between said outer ends of said ply and said bead reinforcing elements within said bead areas.

9. A pneumatic tire according to claim 8, wherein an axially-outer surface of said pneumatic tire along said outer ends of said ply opposite said axially-outward sides of said bead reinforcing elements are formed from elastomeric material.

\* \* \* \* \*